(12) United States Patent
Hall et al.

(10) Patent No.: US 9,372,111 B2
(45) Date of Patent: Jun. 21, 2016

(54) ACOUSTIC SENSOR

(71) Applicant: Board of Regents, the University of Texas System, Austin, TX (US)

(72) Inventors: Neal A. Hall, Austin, TX (US); Michael L. Kuntzman, Austin, TX (US); Donghwan Kim, Austin, TX (US); Nishshanka Hewa-Kasakarage, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 280 days.

(21) Appl. No.: 13/965,057

(22) Filed: Aug. 12, 2013

(65) Prior Publication Data

US 2014/0053650 A1    Feb. 27, 2014

Related U.S. Application Data

(60) Provisional application No. 61/691,613, filed on Aug. 21, 2012, provisional application No. 61/693,111, filed on Aug. 24, 2012.

(51) Int. Cl.
*G01H 5/00* (2006.01)
*G01H 11/06* (2006.01)
(Continued)

(52) U.S. Cl.
CPC ................ *G01H 5/00* (2013.01); *G01H 11/06* (2013.01); *H04R 17/02* (2013.01); *H04R 31/00* (2013.01); *H04R 2201/003* (2013.01)

(58) Field of Classification Search
CPC ......... G01H 5/00; G01H 11/06; H04R 17/02; H04R 2201/003; H04R 31/00
USPC .......................................................... 73/645
See application file for complete search history.

(56) References Cited

U.S. PATENT DOCUMENTS

| 4,628,740 A |   | 12/1986 | Ueda et al. |
|---|---|---|---|
| 4,791,588 A | * | 12/1988 | Onda et al. ................... 700/260 |
| 5,455,475 A |   | 10/1995 | Josse et al. |

(Continued)

FOREIGN PATENT DOCUMENTS

| GB | 2454603 | * | 5/2009 |
|---|---|---|---|
| JP | 2009243981 | * | 10/2009 |

(Continued)

OTHER PUBLICATIONS

R.N. Miles et al., "A low-noise differential microphone inspired by the ears of the parasitoid fly Ormia ochracea," J Acoust Soc Am, vol. 125, pp. 2013-2026, Apr. 2009.

(Continued)

*Primary Examiner* — J M Saint Surin
(74) *Attorney, Agent, or Firm* — Winstead, P.C.

(57) ABSTRACT

A method of designing and manufacturing an acoustic sensor having a high degree of directivity is disclosed. The sensor includes a rotatable plate that is attached to a substrate with mounts. In one aspect the mounts are freely rotatable and the torque on the plate is measured using detectors disposed on springs that provide a resistance to rotation of the plate. In another aspect the plate is mounted to the substrate with mounts that torsionally deform during rotation of the plate. These detectors measure the torque on the plate according to the torsional deformation of the mounts. Methods of improving the signal to noise ratio of acoustic sensors having multiple detectors are also disclosed.

19 Claims, 28 Drawing Sheets

(51) Int. Cl.
*H04R 17/02* (2006.01)
*H04R 31/00* (2006.01)

(56) References Cited

U.S. PATENT DOCUMENTS

| | | | |
|---|---|---|---|
| 6,788,796 B1 | 9/2004 | Miles et al. | |
| 6,963,653 B1 | 11/2005 | Miles | |
| 7,302,864 B2* | 12/2007 | Liu et al. | 73/862 |
| 7,545,945 B2 | 6/2009 | Miles | |
| 7,826,629 B2 | 11/2010 | Miles et al. | |
| 8,467,548 B2 | 6/2013 | Karunasiri et al. | |
| 2006/0130585 A1 | 6/2006 | Magee et al. | |
| 2006/0230834 A1 | 10/2006 | Liu et al. | |
| 2006/0243064 A1* | 11/2006 | Liu et al. | 73/861.25 |
| 2007/0137309 A1 | 6/2007 | Hasken et al. | |
| 2008/0190206 A1 | 8/2008 | Matsumoto et al. | |
| 2008/0236285 A1 | 10/2008 | Mcinerney et al. | |
| 2008/0247573 A1* | 10/2008 | Pedersen | 381/174 |
| 2010/0091613 A1 | 4/2010 | Witte et al. | |
| 2011/0286610 A1 | 11/2011 | Ronald | |
| 2012/0076329 A1 | 3/2012 | Miles | |

FOREIGN PATENT DOCUMENTS

| | | |
|---|---|---|
| JP | 2011-137699 | 7/2011 |
| WO | 2014-031380 | 2/2014 |
| WO | 2014-032061 | 2/2014 |

OTHER PUBLICATIONS

B. Bicen et al., "Integrated optical displacement detection and electrostatic actuation for directional optical microphones with micromachined biomimetic diaphragms," IEEE Sensors Journal, pp. 1933-1941, 2009.
H.-E. de Bree et al., "The acoustic vector sensor, a versatile battlefield acoustics sensor," in Proceedings of SPIE—The International Society for Optical Engineering, 2011.
M.L. et al., Applied Physics Letters, 102, 054109-4 (2013).
B.E. Boser et al., IEEE Journal of Solid-State Circuits, 31, 366-75 (1996).
M. Lemkin et al., A, IEEE Journal of Solid-State Circuits, 34, 456-68 (1999).
K.E. Wojciechowski et al., High-Q Aluminum Nitride MEMS Resonators, Transducers, 2009, Denver, CO, USA, 2009.
G. Piazza et al., Sensors and Actuator A, III 71-8 (2004).
P.J. Stephanou, et al., IEEE Ultrasonics Symposium, 2401-4 (2006).
G. Piazza et al., Solid-State Electronics, 51, 1596-608 (2007).
R.H. Olsson et al., Journal of Microelectromechanical Systems, 18, 671-6 (2009).
R.O. Guldiken et al., IEEE Transactions on Ultrasonics, Ferroelectrics, and Frequency Control, 55, 2236-344 (2008).
R. O. Guldiken et al.,IEEE Transactions on Ultrasonics, Ferroelectrics, and Frequency Control, 56,1270-6 (2009).
R.O. Guldiken et al., IEEE Transactions on Ultrasonics, Ferroelectrics, and Frequency Control, 53, 483-91 (2006).
N.A. Hall et al., IEEE Ultrasonics Symposium 2004, pp. 260-263.
J. Chae, H. Kulah, K. Najafi, Journal of Microelectromechanical Systems, 14, 235-42 (2005).
C. Lu, M. Lemkin, et al., IEEE Journal of Solid-State Circuits, 30, 1367-73 (1995).
N.C. Loh et al., Journal of Microelectromechanical Systems, 11, 182-7 (2002).
C. H. Liu, T.W. Kenny, Journal of Microelectromechanical Systems, 10, 425-33 (2001).
A. Dehe, Sensors and Actuators A, 133, 283-7 (2007).
P.R. Scheeper et al., Journal of Microelectromechanical Systems, 12, 880-91 (2003).
P.R. Scheeper, W. Olthuis, P. Bergveld, Sensors and Actuator A, 40, 179-86 (1994).
D. Hohm et al., Journal of the Acoustical Society of America, 85, 476-80 (1989).
D.T. Martin et al., Journal of Microelectromechanical Systems, 16, 1289-302 (2007).
J.H. Ginsberg, Mechanical and Structural Vibrations: Theory and Applications, New York: John Wiley & Sons; 2001.
V.B. Bokil et al., Journal of Sound and Vibration, 173, 23-41 (1994).
F. Daneshmand et al., Journal of Fluids and Structures, 26,236-52 (2010).
H.A.C. Tilmans, Journal of Micromechanics and Microengineering, 6, 359 (1996).
H.A.C. Tilmans, Journal of Micromechanics and Microengineering, 7, 285 (1997).
S. Roundy, Journal of Intelligent Materials Systems and Structures, 16, 809-23 (2005).
S.B. Horowitz et al., Journal of Micromechanics and Microengineering, 16, 174-81 (2006).
M. Ferrari et al., IEEE Transactions on Instrumentation and Measurement, 55, 2096-101 (2006).
M.L. Kuntzman et al., Journal of Microelectromechanical Systems, 20, 828-33 (2011).
M.D. Williams et al., Journal of Microelectromechanical Systems, 21, 270-83 (2012).
D. Kim et al., Journal of Microelectromechanical Systems, 22, 295-25 302 (2013).
B. Kim, R.H. Olsson, K.E. Wojciechowski, Transducers '11, Beijing, China, 2011, pp. 502-505.
G. Piazza et al., Journal of Microelectromechanical Systems, 15, 1406-18 (2006).
G. Fischerauer et al., IEEE Ultrasonics Symposium 1996, pp. 439-442.
O. Tigli et al., IEEE Sensors Journal, 7, 219-27 (2007).
J. Bouchard, IHS iSuppli Special Report—MEMS Microphones, (2011) (abstract only).
A.M. Amlani et al., Int. J. Audio!. 45, 319-330 (2006).
P. J. Blamey et al., J. Am. Acad. Audio!. 17(7), 519-530 (2006).
B. W. Y. Hornsby et al., Ear Hear. 28(2), 177-186 (2007).
T. Ricketts et al., Ear Hear. 24(5), 424-439 (2003).
C. Gibbons et al., Proceedings of the International Mechanical Engineering Congress and Exposition (IMECE) (ASME, 2000), pp. 1-7; K.
Yoo et al., Sens. Actuators A 97-98, 448-456 (2002).
W. Cui et al., in MEMS 2006 (Istanbul, Turkey, 2006), pp. 614-617.
N. A. Hall et al., Appl. Phys. Lett. 80(20), 3859-3861(2002).
E. S. Kim et al., IEEE Electron Device Lett. 8(10), 467-468 (1987).
M. Royer et al., Sens. Actuators 4, 357-362 (1983).
S. S. Lee et al., J Microelectromech. Syst. 5(4), 238-242 (1996).
R. S. Fazzio et al., in The 14$^{th}$ International Conference on Solid-State Sensors, Actuators and Microsystems Lyon, France, 2007), pp. 1255-1258).
S. A. Saleh et al., in 2003 IEEE 46th Midwest Symposium on Circuits and Systems (2003), vol. 2, pp. 897-900.
H. J. Zhao et al., in the 12$^{th}$ 25 International Conference on Solid State Sensors, Actuators and Microsystems (Boston, 2003) pp. 234-237.
H. Stephen et al., J Acoust. Soc. Am. 122(6), 3428-3436 (2007).
C. B. Sawyer and C. H. Tower, Phys. Rev. 35(3), 269-273 (1930).
C. Wang et al., Appl. Phys. Lett. 90, 172903 (2007).
M. Deshpande and L. Saggere, Sens. Actuator A 135, 690-699 (2007).
H. Jacobsen et al., Sens. Actuator A 135, 23-27 (2007).
L.P. Wang et al., J Microelectromech. Syst. 12(4), 433-439 (2003).
International Search Report corresponding to the PCT/US2013/054572 Application.
International Search Report corresponding to the PCT/US2013/065761 Application.
P. R. Scheeper et al., Sens. Actuators A 44, 1-11 (1994).
M.L. Kuntzman et al., Network Modeling of Multiple-Port, Multiple-Vibration-Mode Transducers and Resonators, Sensors and Actuators: A Physical (2013), http://dx.doi.org/10.1016/j.sna.2013.05.031.
M.L. Kuntzman et al., "Micromachined piezoelectric microphones with in-plane directivity" Appl. Phys. Lett. 102, 054109 (2013).
International Preliminary Report on Patentability for International Application No. PCT/US2013/065761 dated Feb. 24, 2015, pp. 1-8.
International Preliminary Report on Patentability for International Application No. PCT/US2013/054572 dated Feb. 24, 2015, pp. 1-10.

(56) References Cited

OTHER PUBLICATIONS

Extended European Search Report for European Patent Application No. 13 831 722.7 dated Apr. 4, 2016, pp. 1-11.
Miles et al., "A Low-Noise Differential Microphone Inspired by the Ears of the Parasitoid Fly Ormia Ochracea," Journal of the Acoustical Society of America, American Institute of Physics for the Acoustical Society of America, New York, NY, U.S., vol. 125, No. 4, Apr. 1, 2009, pp. 2013-2026.
Cui et al, "Optical Sensing in a directional MEMS Microphone Inspired by the Ears of the Parasitoid Fly, Ormia Ochracea," MEMS 2006, Istanbul, Turkey, Jan. 22-26, 2006, pp. 614-617.

* cited by examiner

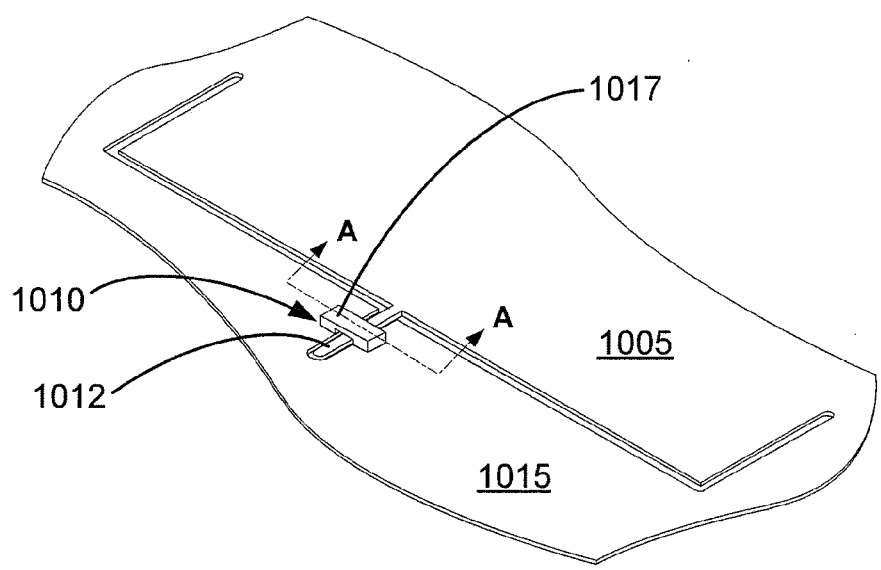
*Fig. 10A*
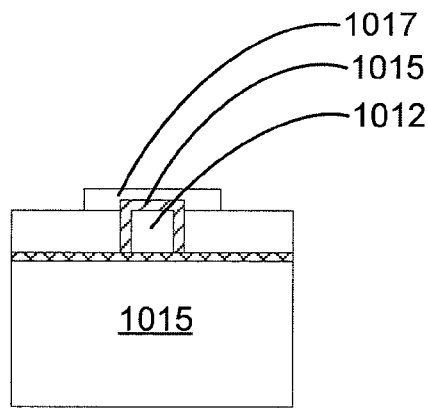 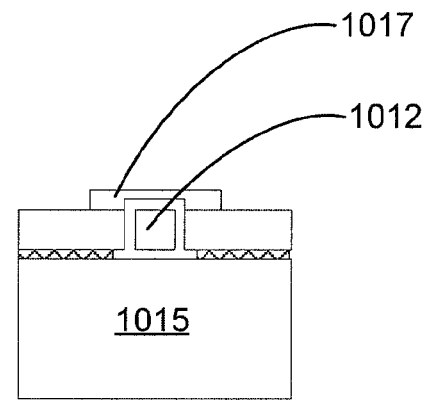
*Fig. 10B*        *Fig. 10C*

(c)

(d)

ACOUSTIC SENSOR

CROSS-REFERENCES TO RELATED APPLICATIONS

This application claims priority to U.S. Provisional Application No. 61/691,613, filed Aug. 21, 2012 titled "ACOUSTIC SENSOR" and to U.S. Provisional Application No. 61/693,111, filed Aug. 24, 2012 titled "ACOUSTIC SENSOR" which are hereby incorporated by reference in their entirety.

GOVERNMENT INTERESTS

This invention was made with government support under Grant No. IIP1026893 awarded by the National Science Foundation. The government has certain rights in the invention.

BACKGROUND

Sound is transmitted by pressure oscillations in air. A microphone is a pressure sensor designed to sense very small pressure oscillations across the audio frequency range (20 Hz-20 kHz). Typically, a compliant diaphragm is designed to deflect in proportion to sound pressure. The deflection is, in-turn, measured in a number of ways (capacitively, optically, or piezoelectrically) to ultimately produce an output voltage in proportion to the sound pressure. Piezoelectric materials produce a voltage when strained. When piezoelectric materials are patterned on a pressure sensitive diaphragm, the deflection of the diaphragm due to sound pressure strains the diaphragm and a voltage is produced by the piezoelectric material. This is one example of how sound is transduced into an electrical signal.

Since their entry into the market, electrostatic microelectro-mechanical systems (MEMS) microphones have become one of the highest growth areas for MEMS, growing from less than 300 million units shipped in 2007 to over 1 billion units shipped in. Apple's iPhone 4 product alone contains three electrostatic MEMS microphones including two in the body of the phone and a third in the mobile headset.

Directional microphones with a high degree of directivity sense sound with high sensitivity in preferred directions, while being relatively insensitive to sound in other directions. Directional microphones may be used in hearing-aids, for example, to avoid the common "cock-tail" party problem. Directivity enables a hearing-aid wearer to listen to a speaker of interest with high sensitivity, while rejecting ambient background noise that would otherwise degrade speech intelligibility, i.e., directional microphones improve signal to noise ratio. Clearly, directional microphones have potential to greatly improve speech intelligibility and signal clarity for a wide suite of consumer electronic devices given the pervasive use of audio in our daily lives (e.g., smartphones, laptop computers, Bluetooth earpieces, hearing aid devices, etc.).

Rotational microphones biologically inspired by a special type of parasitoid fly (Ormia ochracea) have been demonstrated by Miles et al. at SUNY Binghamton and Degertekin et al. at Georgia Tech (R. N. Miles, Q. Su, W. Cui, M. Shetye, F. L. Degertekin, B. Bicen, C. Garcia, S. Jones, and N. Hall, "A low-noise differential microphone inspired by the ears of the parasitoid fly Ormia ochracea," J Acoust Soc Am, vol. 125, pp. 2013-26, April 2009, and B. Bicen, S. Jolly, K. Jeelani, C. Garcia, N. Hall, F. L. Degertekin, Q. Su, W. Cui, and R. Miles, "Integrated optical displacement detection and electrostatic actuation for directional optical microphones with micromachined biomimetic diaphragms," IEEE Sensors Journal, pp. 1933-1941, 2009). In addition to offering a very compact pressure gradient microphone with experimentally verified "figure-8" directivity, laboratory prototypes demonstrated a simultaneous 10 dB lower noise floor and factor of 10-times reduction in size compared to state of the art low-noise miniature microphones used in hearing aids. Demonstrations to date, however, have relied on complex optical readout approaches which face challenging packaging and manufacturing hurdles. Integration of multiple sensors on a single die to realize co-located pressure gradient measurements will also prove challenging due to alignment tolerances between optical and mechanical components. Designing for low power consumption is yet another challenge with optical readout methodologies.

BRIEF SUMMARY

In a first aspect, an acoustic sensor employing a rotatable plate is disclosed. The rotatable plate is mounted to a substrate with freely rotatable mounts that provide near zero rotational stiffness to the plate. The plate is held in place by springs that employ detectors to measure the torque applied to the plate. In one embodiment the detectors are piezoelectric sensors.

In another aspect, a plate is mounted to a substrate with mounts that torsionally deform during rotation of the plate. Detectors that employ shear mode piezoelectric sensing are disposed on the mounts.

In another aspect, sensors employing multiple axes of rotation and springs of varied locations are disclosed. Sensors with multiple axes of rotation may demonstrate a high signal to noise ratio for sound coming from more than one coordinate location.

In another aspect, a plurality of detectors are employed in an acoustic sensor and a method of separating and comparing each of the detector outputs is used to improve the performance of the acoustic sensor. In some embodiments, harmonics of the plate can be removed, improving the signal to noise ratio of the acoustic sensor.

BRIEF DESCRIPTION OF THE DRAWINGS

FIG. 10A is an isometric diagram of a mount employed in an acoustic sensor in accordance with the description herein.

FIG. 10B is a cross-sectional diagram of a mount employed in an acoustic sensor in accordance with the description herein.

FIG. 10C is a cross-sectional diagram of a mount employed in an acoustic sensor in accordance with the description herein.

DETAILED DESCRIPTION

In the following description, various embodiments are described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

The acoustic sensor disclosed herein is suitable for applications that may benefit from microphones having a high degree of directivity. The acoustic sensor includes a plate that is mounted to a substrate. When subjected to sound waves, the rotation of the plate indicates a direction of the source of the sound. Embodiments of the invention are described in detail below.

Figure 1:
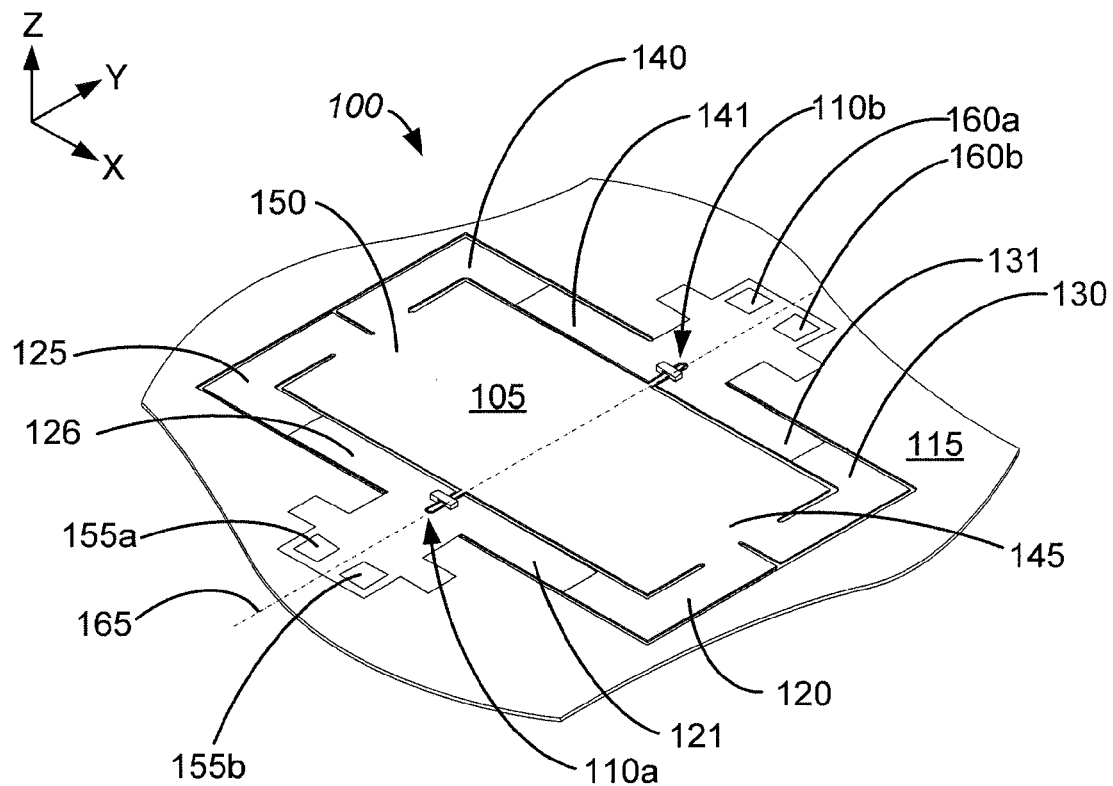
FIG. 1 is an isometric diagram of an acoustic sensor in accordance with the description herein.

FIG. 1 shows an isometric view of an example acoustic sensor 100. The sensor 100 includes a plate 105 having a first distal end 145 opposite a second distal end 150. The plate 105 is configured to rotate about an axis 165 that is oriented parallel to a Y-axis of the sensor 100. The axis 165 is disposed between a first distal end 145 and a second distal end 150. In one embodiment, the plate 105 is affixed to a substrate 115 via mounts 110a, 110b that are freely rotatable during torque of the plate. Freely rotatable, as used herein, means that the mounts 110a, 110b impart negligible resistance to rotation of the plate 105. In another embodiment, the mounts 110a, 110b may torsionally deform during torque of the plate 105 wherein the mounts impart a resistive force to rotation of the plate 105.

In some embodiments, one or more springs 120, 125, 130, 140 are attached to one or more distal ends 145, 150 of the plate 105. The springs 120, 125, 130, 140 may be configured to resist rotation of the plate 105. In some embodiments, the springs 120, 125, 130, 140 may be beams wherein the beams are oriented substantially perpendicular to the first and second distal ends 145, 150 of the plate 105. In some embodiments, the springs 120, 125, 130, 140 may resemble L-shaped beams wherein a first portion of the beam is oriented perpendicular to first and second distal ends 145, 150 of the plate 105 and a second portion of the beam is oriented parallel to first and second distal ends. Other configurations of the springs 120, 125, 130, 140 are within the scope of this disclosure and several other example configurations are disclosed herein.

The sensor 100 is configured to detect a torque of the plate 105 about the axis 165 in response to received acoustic energy and to indicate a direction of a source of the acoustic energy relative to the sensor. The sensor 100 is equipped with one or more detectors 121, 126, 131, 141 that detect the torque of the plate 105. In one embodiment, the detectors 121, 126, 131, 141 are disposed on at least a portion of the springs 120, 125, 130, 140. More specifically, the detectors 121, 126, 131, 141 may sense torque of the plate 105 by indicating a deflection of the springs 120, 125, 130, 140. In some embodiments, the detectors 121, 126, 131, 141 may employ piezoelectric sensors to measure pressure, strain or force in the springs 120, 125, 130, 140. In other embodiments, the detectors 121, 126, 131, 141 may employ strain sensors such as strain gauges to measure the strain, or deflection, of the springs 120, 125, 130, 140. Other sensors are within the scope of this disclosure. In one embodiment, the rotational vibration of the structure is read using thin piezoelectric films near the base of each spring 120, 125, 130, 140 which convert strain energy into electric potential. The applied torque may be in direct proportion to the instantaneous spatial derivative of pressure, so this type of the sensor may also be called a pressure gradient sensor. The sensor may include piezoelectric sensing regions, which in some embodiments consist of deposited lead zirconate titanate (PZT) sandwiched between platinum (Pt) electrodes. In many embodiments, detectors may have one or more electrical connections 155a, 155b, 160a, 160b to facilitate their operation and connectivity with an external electrical system. Although four springs and four detectors are illustrated here, other configurations may include more or less springs and/or detectors. Additionally, in some embodiments, the number of detectors does not equal the number of springs.

Figure 2:
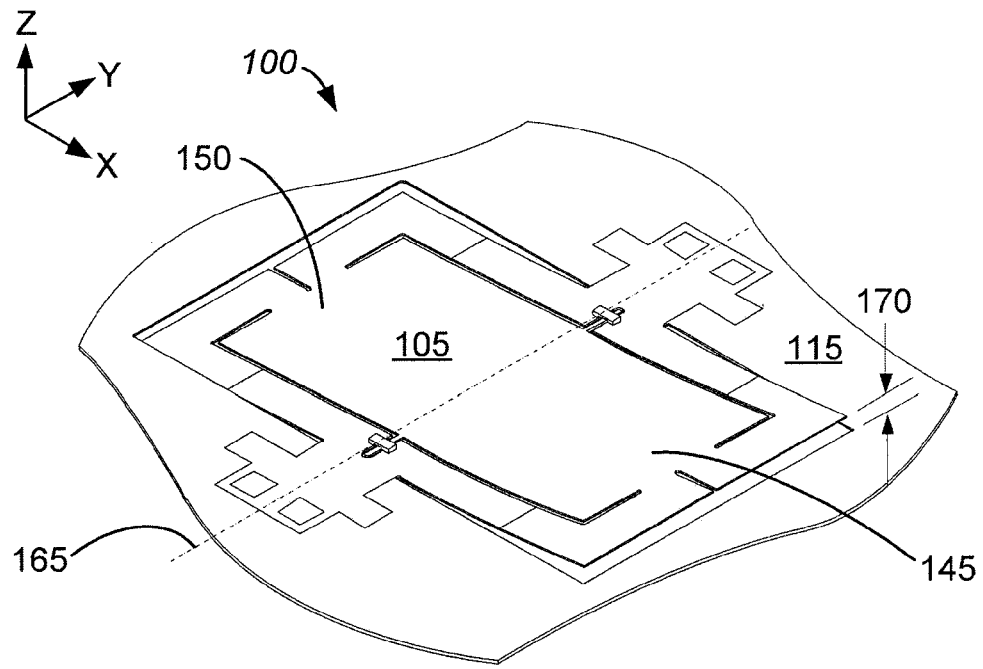
FIG. 2 is an isometric diagram of an acoustic sensor in accordance with the description herein.

The sensor 100 may be configured to have a high degree of directivity. That is, sensor 100 may exhibit a high signal to noise ratio when sound approaches from one or more particular directions and may exhibit a much lower signal to noise ratio when sound approaches from one or more different directions. Directivity of an acoustic sensor may be characterized by a polar plot, which is a plot of the sensitivity of the structure vs. direction of incoming sound. Some embodiments of are predicted to have a "figure 8" directivity, as is known in the art. More specifically, some embodiments, as illustrated in FIGS. 1 and 2, may demonstrate a high signal to noise ratio when sound waves are oriented parallel to the X-axis. In this scenario, as illustrated in FIG. 2, the sound waves cause a pressure imbalance across the plate 105 and cause the plate to rotate about the axis 165 (the Y-axis) causing a first distal end 145 deflection 170. For example, a sound wave may impart a downward pressure on second distal end 150 that exceeds the downward pressure imparted in the first distal end 145, causing the plate 105 to rotate in a counter-clock-wise direction about axis 165 (Y-axis). The rotation of the plate 105 causes the springs 120, 125, 130, 140 to deflect and causes the detectors 121, 126, 131, 141 to indicate the torque on the plate. Conversely, if sound approaches the sensor 100 aligned with the Y-axis, the sound waves impinge both distal ends 145, 150 of the plate 105 simultaneously so the plate 105 does not rotate about the axis 165. Thus, the springs 120, 125, 130, 140 do not deflect and the detectors 121, 126, 131, 141 do not indicate a torque on the plate 105. Similarly, if sound waves approach the sensor 100 aligned with the Z-axis, the sound waves impinge on both distal ends 145, 150 of the plate 105 simultaneously so the plate 105 does not rotate about the axis 165. If sound waves approach sensor from a direction out of near perfect alignment with the X, Y or Z axes, a vector decomposition can be employed and only the component of the sound impinging sensor 100 oriented with the X-axis will have a high signal to noise ratio. Thus, the sensor 100 may exhibit a high degree of directivity.

The present invention has a wide variety of application examples, some of which are described herein. For instance, the acoustic sensors may be used within consumer audio products for directional sensing under a variety of application modalities. In some embodiments, directional microphones with fixed directivity patterns can focus on a speaker speaking into a smartphone, while rejecting ambient noise from a street (car or buss passing, etc.). As a drop in replacement to omni-directional MEMS microphones, directional microphones offer system integrators an immediate advantage. Multiple directional microphones may be combined with digital signal processing thereby enabling advance modalities, some of which are described herein. Smartphones and other consumer communication devices using embodiments of the acoustic sensors described herein will have the ability to focus on a speaker of interest and track the speaker when moving about a room. Further, the embodiments of the acoustic sensors may be used in devices within noisy areas with high background noise (e.g., lunch at a noisy restaurant) for use within a speaker phone application which can identify which person in a crowd or conference (e.g., at a table) is speaking In some embodiments, audio sensing resources may focus on an individual in a conference while rejecting all other ambient noise. In some embodiments, the acoustic sensors provided herein may provide a directional audio differentiating feature for system integrators (e.g., consumer audio).

In some embodiments, such as illustrated in FIGS. 1 and 2, more than one detector 121, 126, 131, 141 may be used. When more than one detector 121, 126, 131, 141 is employed the selective addition or subtraction of detector output can increase or decrease the sensitivity of certain modes of the sensor 100 as desired. Thus, in some embodiments, each detector 121, 126, 131, 141 may be read individually and the readings may be compared and used to achieve myriad features. In one embodiment, subtraction of detector readings is equivalent to measuring "the difference signal" between detectors and can be achieved using a differential amplifier or similar means. In other embodiments, the addition of detector signals can be achieved by physically connecting the ports (in series or parallel), or by connecting each port to the input of a summing amplifier. In other embodiments a digital processor may be employed to analyze the differences between individual detector readings to extract additional information from sensor 100.

In some embodiments, the difference between the detectors 121, 126, 131, 141 may be used to determine when a harmonic of the sensor 100 has been excited and to extract the harmonic vibrations from the signal to improve the signal to noise ratio. In other embodiments, sound approaching along the Y-axis may cause sensor 100 to rock about an axis other than the Y-axis and the difference between the detectors 121, 126, 131, 141 may be used to extract that information to improve the signal to noise ratio. Other features and applications using the difference in output between the detectors 121, 126, 131, 141 may be employed.

Figure 3:
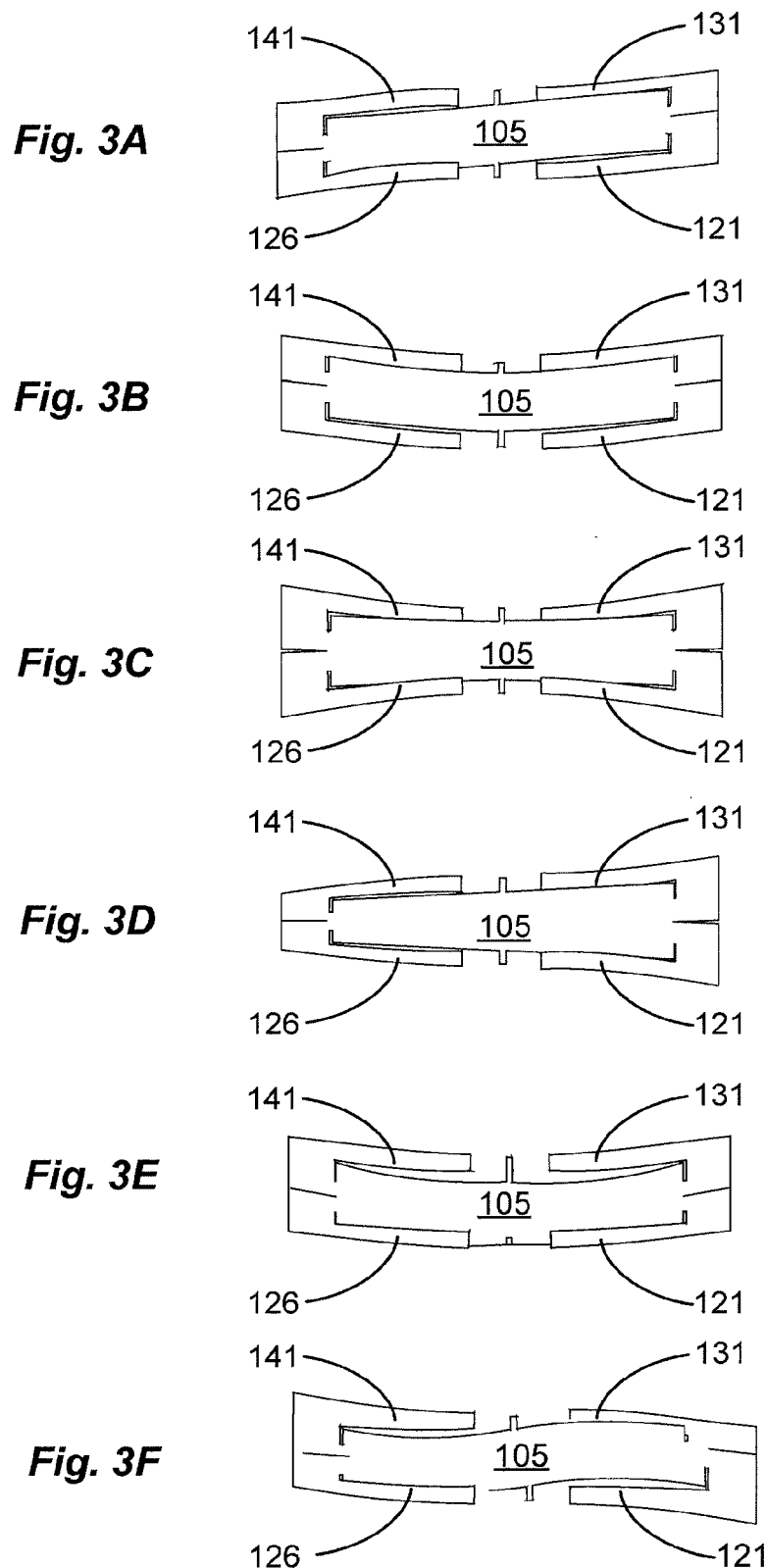
FIG. 3A is an isometric diagram of an acoustic sensor in accordance with the description herein.
FIG. 3B is an isometric diagram of an acoustic sensor in accordance with the description herein.
FIG. 3C is an isometric diagram of an acoustic sensor in accordance with the description herein.
FIG. 3D is an isometric diagram of an acoustic sensor in accordance with the description herein.
FIG. 3E is an isometric diagram of an acoustic sensor in accordance with the description herein.
FIG. 3F is an isometric diagram of an acoustic sensor in accordance with the description herein.

FIGS. 3A-3F illustrate six harmonic mode shapes of the sensor 100. As discussed above, in some embodiments, the first mode (FIG. 3A) is the fundamental mode caused by sound traveling along the X-axis and is the desired response of the sensor 100. In some embodiments, it may be desirable to sense the torque on the plate 105 due to the first mode (FIG. 3A) and to attenuate signals resulting from the second mode (FIG. 3B). In one embodiment, reading the difference between the detectors 131 and 141, and similarly between the detectors 121 and 126, may increase sensitivity to the first mode (FIG. 3A) while simultaneously decreasing sensitivity to the second mode (FIG. 3B). More specifically, the first mode (FIG. 3A) can be distinguished from the second mode (FIG. 3B) in that the detectors 121 and 131 are out of phase with the detectors 126 and 141 for the desired first mode, but all detectors are in phase in the second mode (FIG. 3B). If detector sensitivities are perfectly matched, any of the above configurations may result in the non-desirable second mode (FIG. 3B) being completely removed from the output signal, while the first mode (FIG. 3A) signal may be doubled.

In other embodiments the third (FIG. 3C) mode and fourth mode (FIG. 3D) effects on the output signal can be reduced or eliminated by summing the detectors 121 and 131 and/or the detectors 126 and 141. The fifth mode (FIG. 3E) has phase relations resembling the second mode (FIG. 3B). The sixth mode (FIG. 3F) has phase relations resembling the first mode (FIG. 3A). Thus, in some embodiments, taking the difference of the detectors 121 and 126 and/or similarly the difference between the detectors 131 and 141 will decrease or eliminate sensitivity to the fifth mode (FIG. 3E), while increasing sensitivity to the sixth mode (FIG. 3F). It should be noted that the sixth mode (FIG. 3F) is excited by pressure gradients across the length of the plate 105, similar to the first mode (FIG. 3A). In some embodiments, the combination of the first (FIG. 3A) and sixth (FIG. 3F) modes could therefore potentially be used to realize a broadband, directional microphone/ultrasound acoustic sensor.

Given the above discussion, in some embodiments, the optimal configuration for the sensor (for use as a pressure gradient sensor with sensitive axis being the X-axis labeled in FIG. 1) is: detector (121+131)−(126+141) where "−" means taking "the difference signal between". In other embodiments, detectors 121 and 131 could be poled with reversed polarity with respect to detectors 126 and 141, in which case, the same effect could be achieved by simply summing all detectors (121+131+126+141). Either of these two configurations may results in decreased or vanishing sensitivity to undesirable second (FIG. 3B), third (FIG. 3C), fourth (FIG. 3D), and fifth (FIG. 3E) modes with increased (ideally doubled) sensitivity to first (FIG. 3A) and sixth (FIG. F) desired modes. In further embodiments, if wide-band operation beyond audio frequency is not desired (as in hearing aid and other applications), the sixth mode (FIG. 3F) can be filtered from the response electrically.

Figure 4:
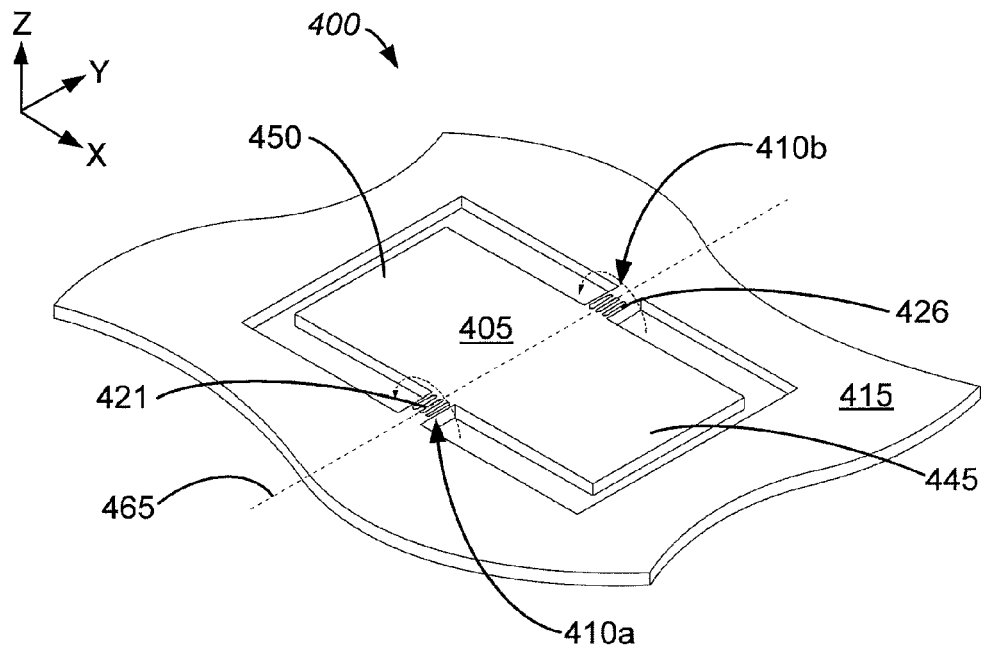
FIG. 4 is an isometric diagram of an acoustic sensor in accordance with the description herein.
Figure 5:
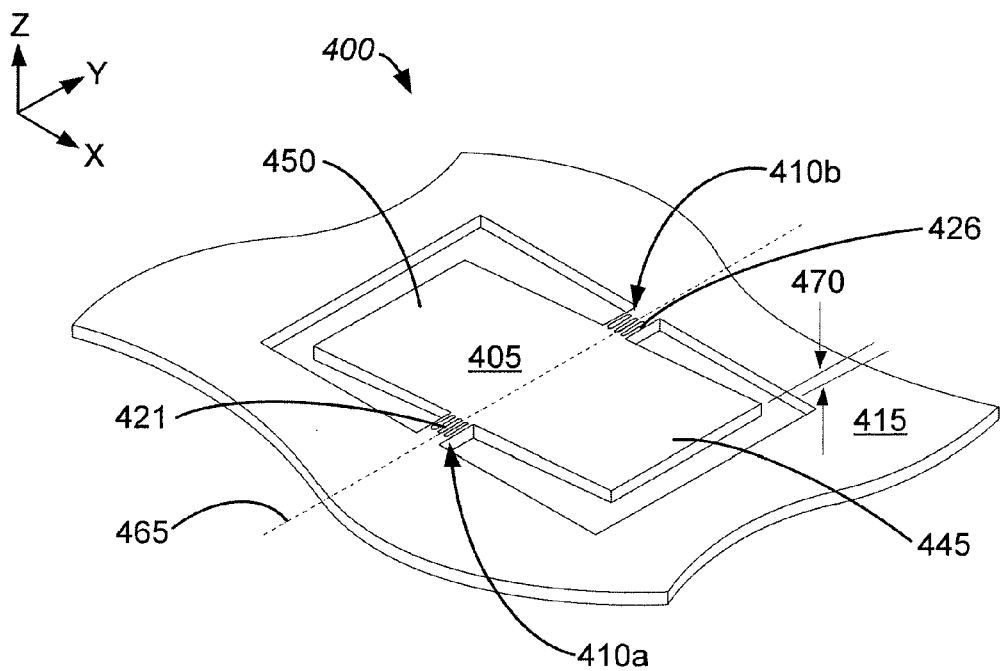
FIG. 5 is an isometric diagram of an acoustic sensor in accordance with the description herein.

FIGS. 4 and 5 illustrate an isometric view of another embodiment, example acoustic sensor 400. The sensor 400 includes a plate 405 having a first distal end 445 opposite a second distal end 450. The plate 405 is configured to rotate about an axis 465 that is oriented parallel to a Y-axis of the sensor 400. The axis 465 is disposed between a first distal end 445 and a second distal end 450. In one embodiment, the plate 405 is affixed to a substrate 415 via one or more mounts 410a, 410b that torsionally deform during torque of the plate. Two mounts 410a, 410b are illustrated here, however other embodiments may have only one mount. Torsionally deform, as used herein, means that mounts 410a, 410b deform when the plate 405 is rotated and the mounts impart resistance to rotation of the plate 405. In another embodiment, the mounts 410a, 410b may be freely rotatable wherein the mounts 410a, 410b impart a negligible resistive force to rotation of the plate 405.

Figure 6:
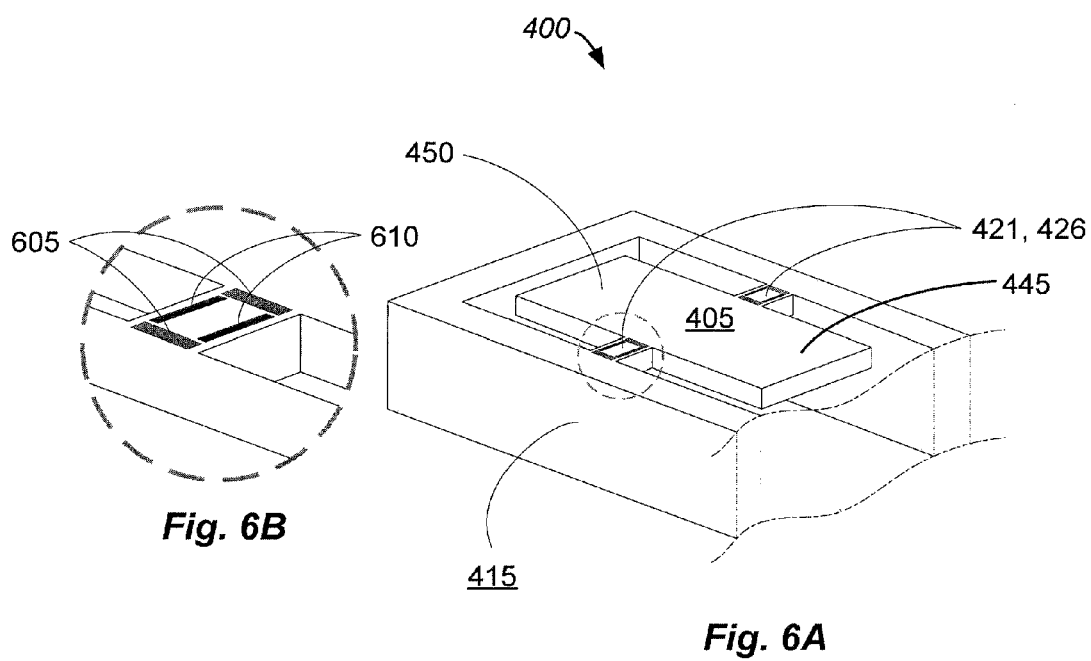
FIG. 6A is an isometric diagram of an acoustic sensor in accordance with the description herein.
FIG. 6B is an isometric diagram of a detector employed in an acoustic sensor in accordance with the description herein.

Sensor 400 is configured to detect a torque of the plate 405 about the axis 465 in response to received acoustic energy and to indicate a direction of a source of the acoustic energy relative to the sensor. The sensor 400 is equipped with one or more detectors 421, 426 that detect the torque of the plate 405. In one embodiment, the detectors 421, 426 are disposed on at least a portion of the mounts 410a, 410b. More specifically, the detectors 421, 426 may sense torque of the plate 405 by indicating a deformation of the mounts 410a, 410b. In some embodiments, the detectors 421, 426 may employ piezoelectric sensors to measure pressure, strain or force in the mounts 410a, 410b. In other embodiments, the detectors 421, 426 may employ strain sensors such as strain gauges to measure the strain, or deflection, of the mounts 410a, 410b. Other sensors are within the scope of this disclosure. In one embodiment illustrated in FIGS. 6A and 6B, electrode pairs are used to sense shear stress in the mounts 410a, 410b. In some embodiments, an electrode pair 605 is used for poling and an electrode pair 610 is used for sensing. Alternatively, the electrode pair 610 may be used for poling and the electrode pair 605 may be used for sensing. In some embodiments, the detectors 421, 426 may have one or more electrical connections (not shown) to facilitate their operation and connectivity with an electrical system. Although two mounts and two detectors are illustrated here, other configurations may include more or less mounts and/or detectors. Additionally, in some embodiments, the number of detectors does not equal the number of mounts.

The sensor 400 may be configured to have a high degree of directivity, as discussed above with regard to the sensor 100. That is, the sensor 400 may exhibit a high signal to noise ratio when sound approaches from one or more particular directions and may exhibit a much lower signal to noise ratio when sound approaches from one or more different directions. More specifically, some embodiments, as illustrated in FIGS. 4 and 5, may demonstrate a high signal to noise ratio when sound waves are oriented parallel to the X-axis. In this scenario, as illustrated in FIG. 5, the sound waves cause a pressure imbalance across the plate 405 and cause the plate to rotate about the axis 465 (Y-axis) causing a first distal end 445 deflection 470. For example, a sound wave may impart a downward pressure on second distal end 450 that exceeds the downward pressure imparted in the first distal end 445, causing the plate 405 to rotate in a counter-clock-wise direction about the axis 465 (Y-axis). The rotation of the plate 405 causes the mounts 410a, 410b to deform and the detectors 421, 426 indicate the torque on the plate. Conversely, if sound approaches the sensor 400 aligned with the Y or Z-axis, the sound waves impinge both distal ends 445, 450 of the plate 405 simultaneously so the plate does not rotate about the axis 465.

In some embodiments, the difference between the detectors 421, 426 may be used to determine when a harmonic of the sensor 400 has been excited and to extract the harmonic vibrations from the signal to improve the signal to noise ratio. In other embodiments, sound approaching along the Y or Z-axis may cause the sensor 400 to rock about an axis other than the Y-axis and the difference between the detectors 421, 426 may be used to extract that information to improve the signal to noise ratio. Other features and applications using the difference between the detectors 421, 426 may be employed. Some of such features and embodiments are discussed above.

Figure 7:
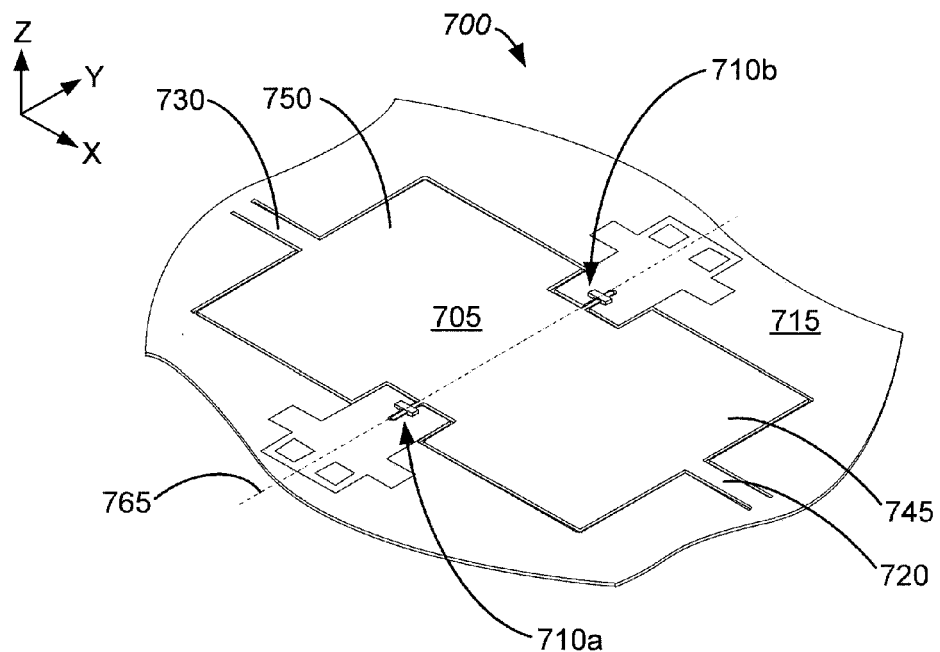
FIG. 7 is an isometric diagram of an acoustic sensor in accordance with the description herein.

It will be appreciated that the acoustic sensor described herein is illustrative and that variations and modifications are possible. For example, FIG. 7 shows an isometric view of an example acoustic sensor 700. The sensor 700 includes a plate 705 having a first distal end 745 opposite a second distal end 750. The plate 705 is configured to rotate about an axis 765 that is oriented parallel to a Y-axis of the sensor 700. The axis 765 is disposed between the first distal end 745 and the second distal end 750. In one embodiment, the plate 705 is affixed to a substrate 715 via mounts 710a, 710b that are freely rotatable during torque of the plate. In another embodiment, the mounts 710a, 710b may torsionally deform during torque of the plate 705 wherein the mounts impart a resistive force to rotation of the plate.

In some embodiments, one or more springs 720, 730 are attached to one or more distal ends 745, 750 of the plate 705. The springs 720, 730 may be configured to resist rotation of the plate 705. In some embodiments, the springs 720, 730 may comprise beams wherein the beams are oriented substantially perpendicular to the first and second distal ends 745, 750 of the plate 705. Other configurations of the springs 720, 730 are within the scope of this disclosure.

The sensor 700 is configured to detect a torque of the plate 705 about the axis 765 in response to received acoustic energy and to indicate a direction of a source of the acoustic energy relative to the sensor. The sensor 700 is equipped with one or more detectors (not shown) that detect the torque of the plate 705. As discussed above, in some embodiments, detectors may be disposed on at least a portion of the springs 720, 730 while in other embodiments the detectors may be disposed on one or more mounts 710a, 710b.

The sensor 700 may be configured to have a high degree of directivity. That is, as discussed above, the sensor 700 may exhibit a high signal to noise ratio when sound approaches from one or more particular directions and may exhibit a much lower signal to noise ratio when sound approaches from one or more different directions.

Figure 8:
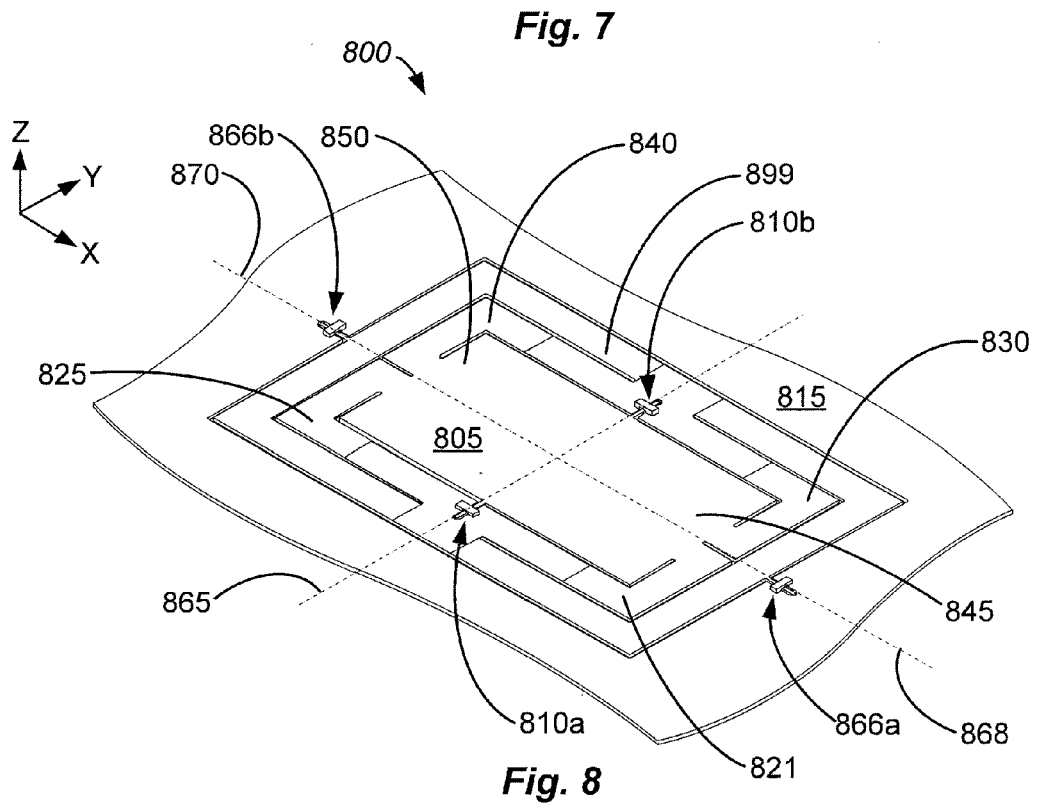
FIG. 8 is an isometric diagram of an acoustic sensor in accordance with the description herein.

As another example, FIG. 8 shows an isometric view of an example acoustic sensor 800. The sensor 800 includes a plate 805 having a first distal end 845 opposite a second distal end 850. The plate 805 is configured to rotate about an axis 865 that is oriented parallel to a Y axis of the sensor 800. The axis 865 is disposed between the first distal end 845 and the second distal end 850. In one embodiment, the plate 805 is affixed to a secondary plate 899 via mounts 810a, 810b that are freely rotatable during torque of the plate. In another embodiment, the mounts 810a, 810b may torsionally deform during torque of the plate 805 wherein the mounts impart a resistive force to rotation of the plate.

In some embodiments, one or more springs 821, 825, 830, 840 are attached to one or more distal ends 845, 850 of the plate 805. The springs 821, 825, 830, 840 may be configured to resist rotation of the plate 805. In some embodiments, the springs 821, 825, 830, 840 may be beams wherein the beams are oriented substantially perpendicular to the first and second distal ends 845, 850 of the plate 805. Other configurations of the springs 821, 825, 830, 840 are within the scope of this disclosure. The secondary plate 899 may be configured to rotate about an axis 868 that is oriented parallel to an X-axis of the sensor 800. In one embodiment, a secondary plate 899 is affixed to a substrate 815 via mounts 866a, 866b that are freely rotatable during torque of the plate. In another embodiment, the mounts 866a, 866b may torsionally deform during torque of the secondary plate 899 wherein the mounts impart a resistive force to rotation of the secondary plate.

The sensor 800 is configured to detect a torque of the plate 805 about the axis 865, and a torque of the secondary plate 899 about the axis 868 in response to received acoustic energy and to indicate a direction of a source of the acoustic energy relative to the sensor. The sensor 800 is equipped with one or more detectors (not shown) that detect the torque of the plate 805 and secondary plate 899. As discussed above, in some embodiments, detectors may be disposed on at least a portion of the springs 821, 825, 830, 840 while in other embodiments the detectors may be disposed on one or more mounts 810a, 810b, 866a, 866b.

Sensor 800 may be configured to have a high degree of directivity. That is, as discussed above, the sensor 800 may exhibit a high signal to noise ratio when sound approaches from one or more particular directions and may exhibit a much lower signal to noise ratio when sound approaches from one or more different directions.

In some embodiments, the difference in readings between detectors may be used to determine when a harmonic of the sensor 800 has been excited and to extract the harmonic vibrations from the signal to improve the signal to noise ratio. In other embodiments, sound approaching along a particular axis may cause the sensor 800 to rock about one or more axes, and the difference in readings between detectors may be used to extract information to improve the signal to noise ratio and more accurately detect the direction of the source of sound. In some embodiments, the acoustic sensor may have three or more axes of rotation and a signal processor may be used to maximize the signal to noise ratio in one or more particular directions while attenuating the signal from one or more other directions. In some embodiments, particular frequencies may be received from one or more directions while other frequencies are attenuated from one or more other directions. Other features and applications using multiple axes of rotation and/or the signal difference between detectors may be employed.

In some embodiments the plate may be sized to be larger or smaller than a particular frequency range of interest. In many embodiments the size of the final product may influence the size of the plate, for instance a very small cellphone microphone versus a much larger recording studio microphone. In other embodiments the frequency range of interest may dictate the size of the plate. For instance, a microphone for a hearing aid may be used between 20 to 2000 Hz versus an ultrasonic microphone that may be used upwards of 200 kHz. An ultrasonic microphone may require a plate of smaller dimensions and less torsional stiffness. In one embodiment the plate has a length of over two inches and a width of over one inch. In one embodiment the plate has a length between two inches and 0.080 inches and a width between one inch and 0.040 inches. In another embodiment the plate has length between 0.080 inches and 0.020 inches and a width between 0.040 inches and 0.010 inches. In one embodiment, the plate has a length of approximately 0.080 inches and a width of approximately 0.040 inches. In further embodiments the plate has a thickness greater than 0.500 inches. In another embodiment the plate has a thickness between 0.500 inches and 0.020 inches. In one embodiment the plate has a thickness between 0.020 inches and 0.0005 inches. In one embodiment the plate has a thickness of approximately 0.001 inches. In other embodiments the plate is not rectangular and may be octagonal, square, round, concave, convex, serpentine or any other shape.

Example Manufacturing Process

Bulk and surface micromachining techniques may be employed in some embodiments to realize structures that mechanically respond to sound preferably in certain directions while resisting response to sound arriving in other directions. With directivity built into the mechanical structure, no electronics may be required to implement directivity and the sensor may not suffer from phase matching issues as in the case of omnidirectional microphone pairs configured for a directional response.

Figure 9A:
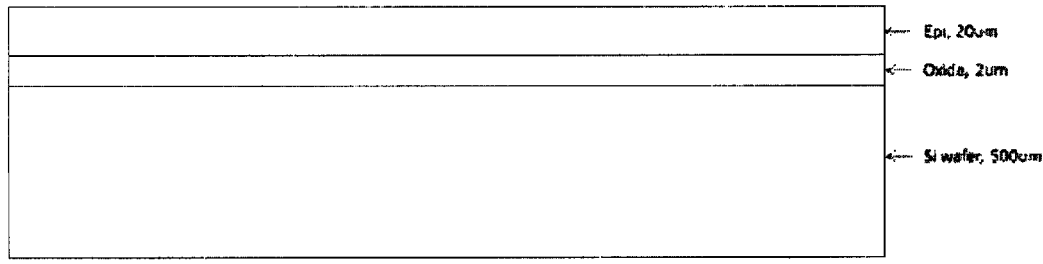
FIG. 9A is a cross-sectional diagram of a fabrication method for an acoustic sensor in accordance with the description herein.
Figure 9B:
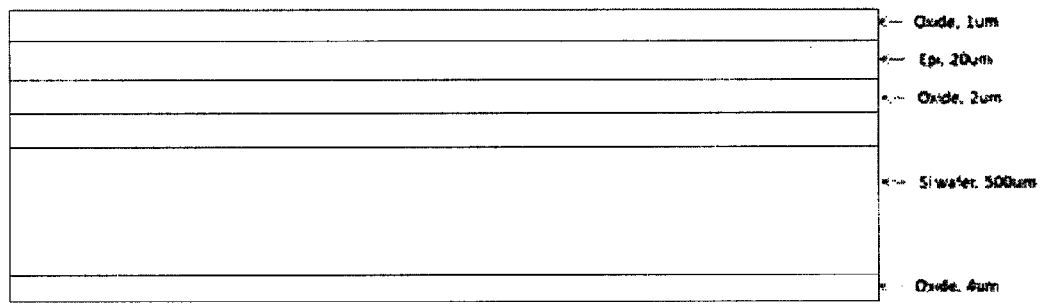
FIG. 9B is a cross-sectional diagram of a fabrication method for an acoustic sensor in accordance with the description herein.
Figure 9C:
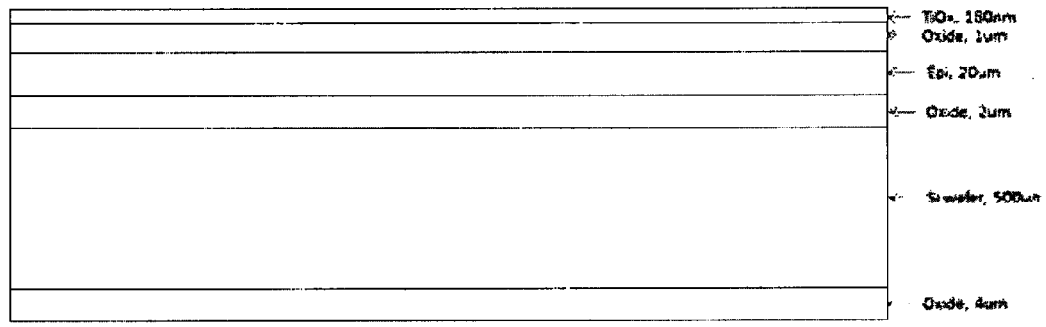
FIG. 9C is a cross-sectional diagram of a fabrication method for an acoustic sensor in accordance with the description herein.
Figure 9D:
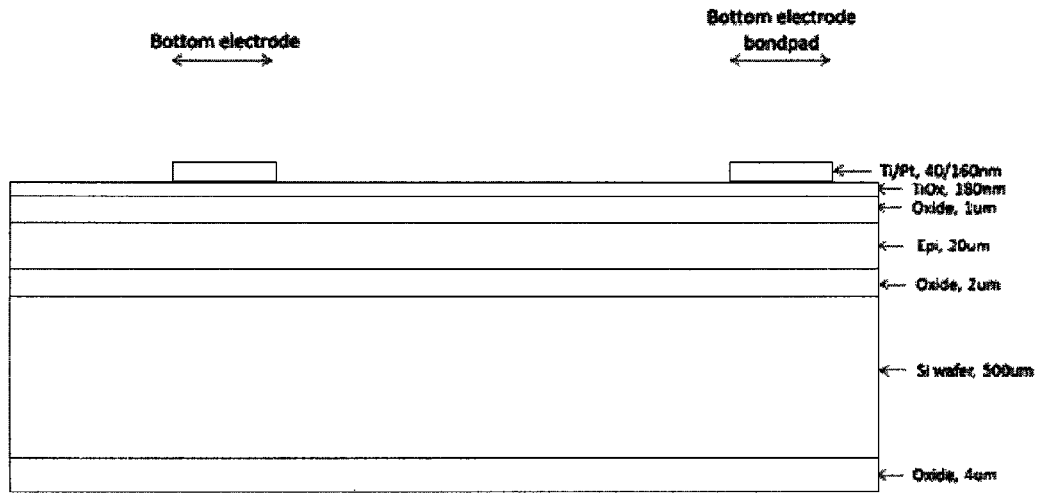
FIG. 9D is a cross-sectional diagram of a fabrication method for an acoustic sensor in accordance with the description herein.
Figure 9E:
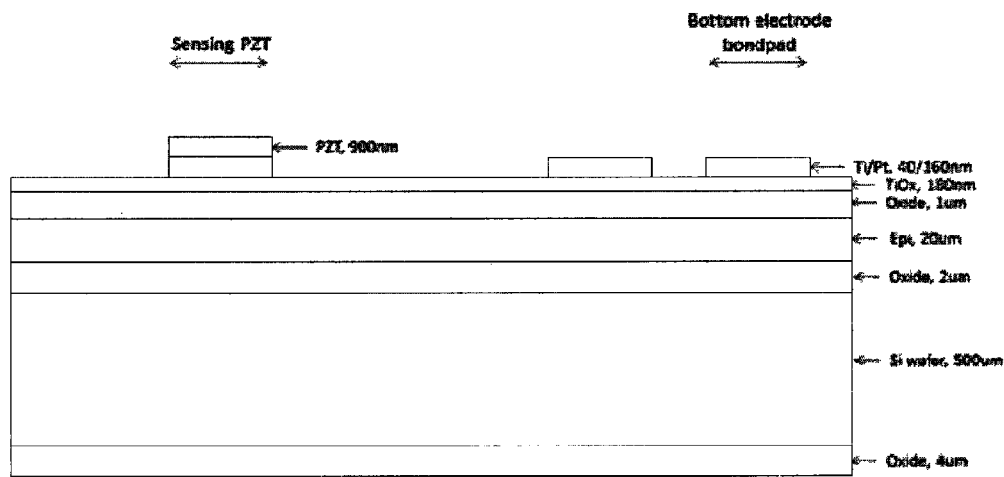
FIG. 9E is a cross-sectional diagram of a fabrication method for an acoustic sensor in accordance with the description herein.
Figure 9F:
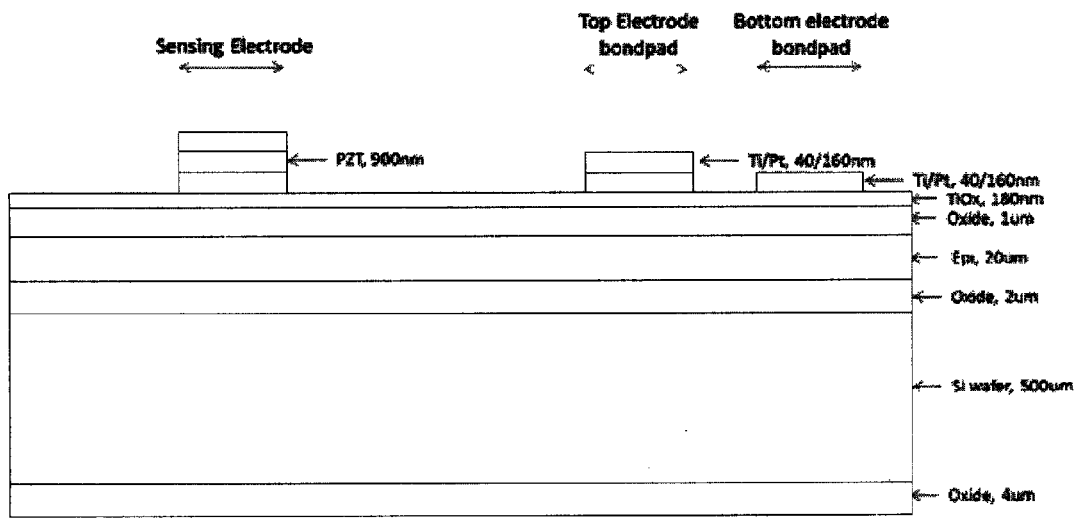
FIG. 9F is a cross-sectional diagram of a fabrication method for an acoustic sensor in accordance with the description herein.
Figure 9G:
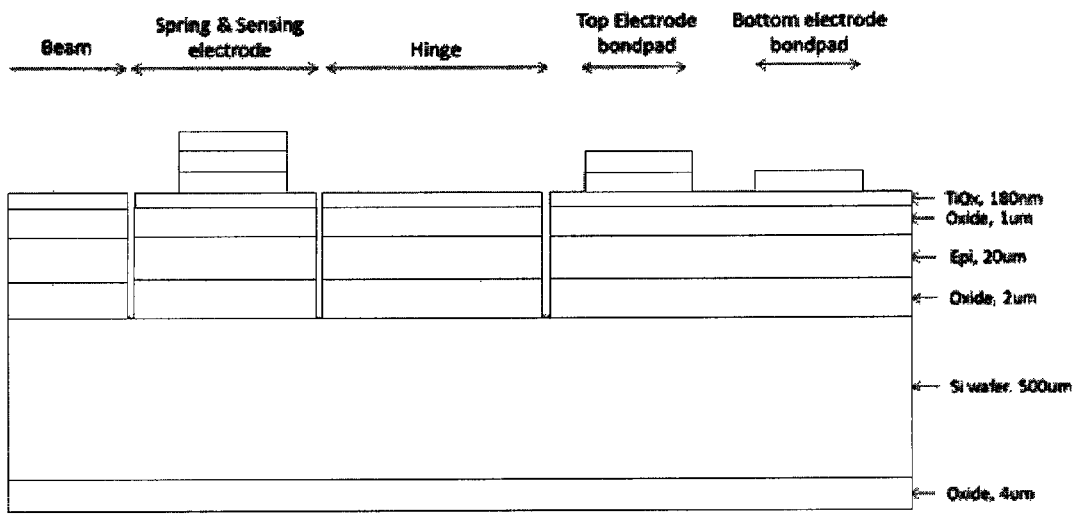
FIG. 9G is a cross-sectional diagram of a fabrication method for an acoustic sensor in accordance with the description herein.
Figure 9H:
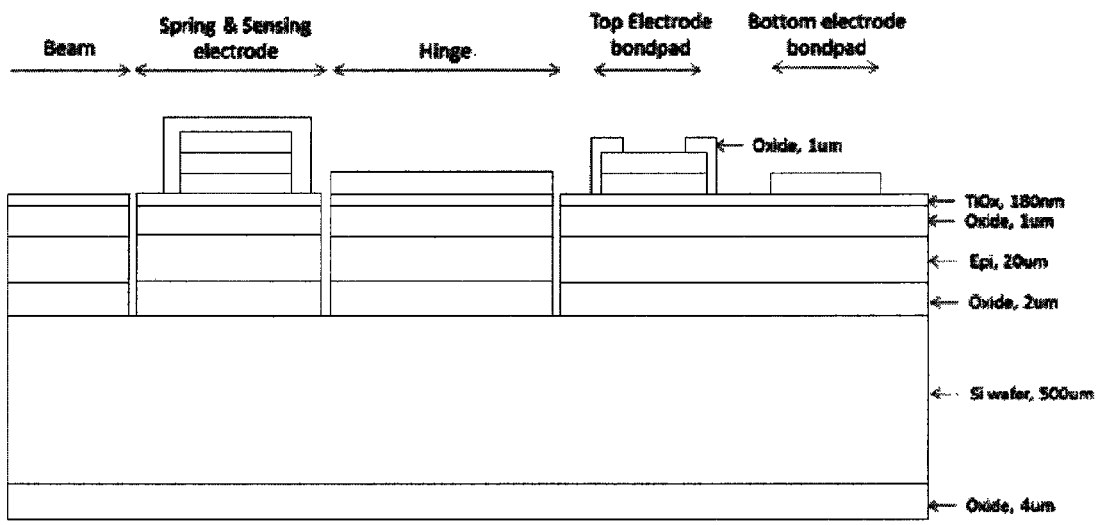
FIG. 9H is a cross-sectional diagram of a fabrication method for an acoustic sensor in accordance with the description herein.
Figure 9I:
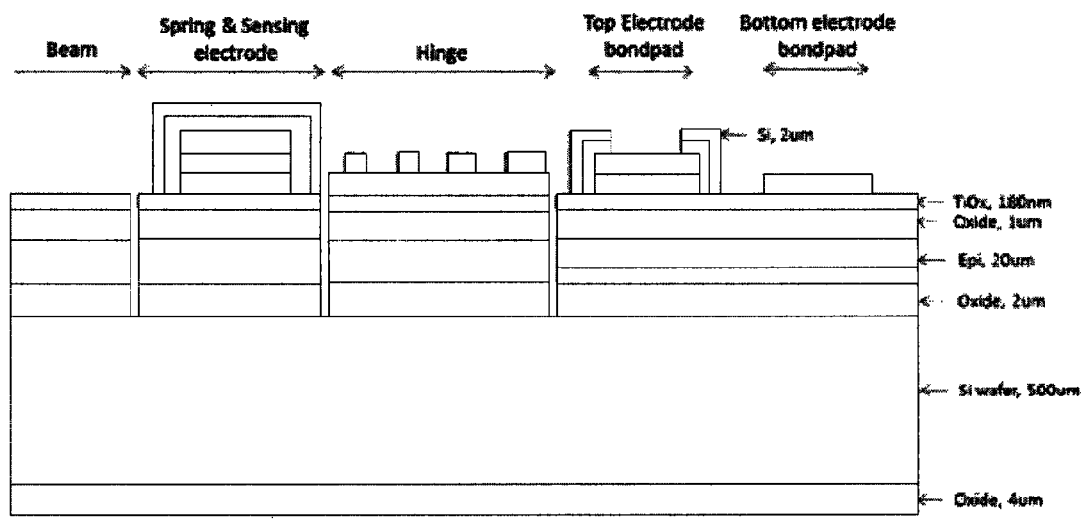
FIG. 9I is a cross-sectional diagram of a fabrication method for an acoustic sensor in accordance with the description herein.
Figure 9J:
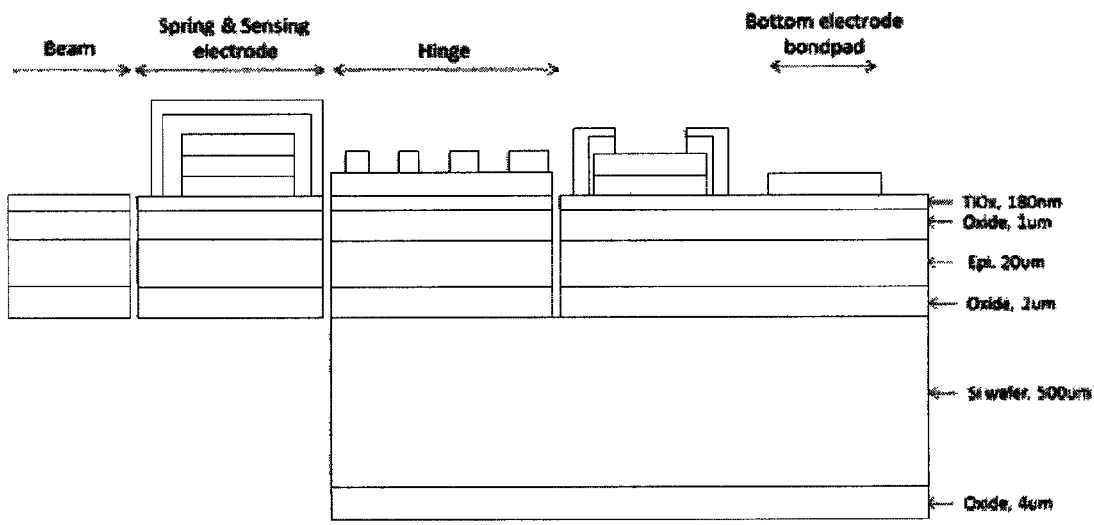
FIG. 9J is a cross-sectional diagram of a fabrication method for an acoustic sensor in accordance with the description herein.
Figure 9K:
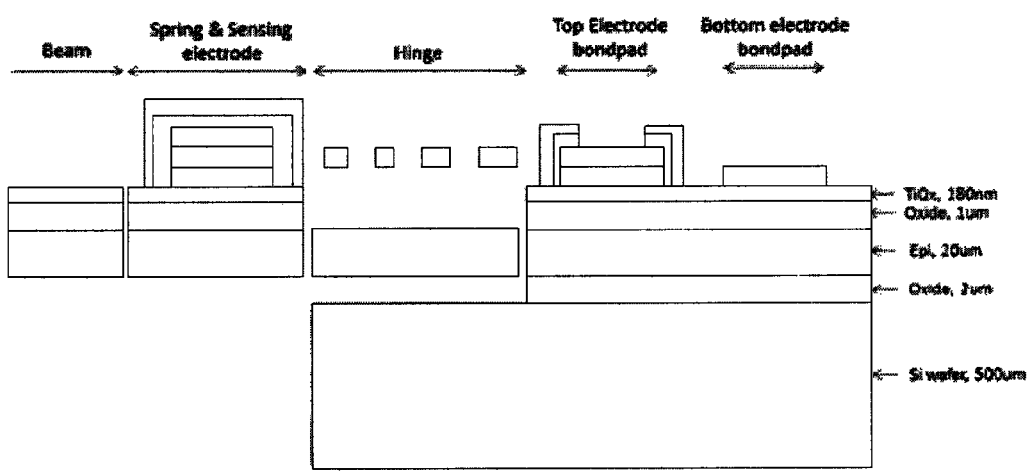
FIG. 9K is a cross-sectional diagram of a fabrication method for an acoustic sensor in accordance with the description herein.

In some embodiments, a silicon-based MEMS structure may be used to fabricate the acoustic sensor. In FIG. 9A, the process is initiated with a Silicon-On-Insulator (SOI) wafer. A single-crystalline epitaxial (epi) silicon layer may be used to form the mechanical structure. In FIG. 9B, oxide layers are deposited on the front and back. The front oxide may serve as an adhesion layer and the thicker back oxide may serve as a hard mask for the backside etch near the end of the process. In FIG. 9C titanium oxide is deposited, which may serve as a diffusion barrier for the PZT. In FIG. 9D titanium (Ti) and platinum (Pt) are deposited and patterned via a lift-off process to form bottom electrode, traces, and bottom electrode bondpads. In FIG. 9E PZT is deposited by a sol-gel method and may be patterned using a wet etch of HCl+HF. In FIG. 9F Titanium (Ti) and Platinum (Pt) are deposited and patterned to form top electrode, traces, and top electrode bondpads. In FIG. 9G an etch is performed through the $TiO_x$, $SiO_2$, silicon epi, and buried $SiO_2$ layers to form the beam, springs, and pivot structures of the acoustic sensor. In FIG. 9H a sacrificial oxide layer is deposited and patterned, which forms the gaps between the pin and the top of the hinge, when removed. In FIG. 9I, a silicon layer is deposited and patterned which i) forms the top of the hinge, ii) protects the PZT during wet etch steps later in the process, and iii) can be used to form parts of the mechanical beam and/or spring structures to allow greater design flexibility. In FIG. 9J, an etch is performed through the backside of the wafer to free the mechanical plate and springs. The backside oxide is patterned first to form a hard back for the backside silicon etch. The buried oxide layer serves as an etch stop. In FIG. 9K a wet etch in BOE or HF is used to release the hinge structure and form freely-rotating pivot. If this step is skipped, the sacrificial oxide, and silicon deposition/patterning steps can also be skipped and the device will have a torsional mount instead of a freely-rotating mount.

FIGS. 10A-10C illustrate one embodiment of a freely rotating mount 1010. FIG. 10A illustrates an isometric view of a plate 1005 affixed to a substrate 1015 via a mount 1010 that is freely rotatable during torque of the plate. FIG. 10B illustrates cross-section A-A of the mount 1010 prior to release. A pin 1012 is encased in oxide 1015 and hence unable to rotate. FIG. 10C illustrates cross-section A-A after release wherein the oxide 1015 has been removed and the pin 1012 is free to rotate. The pin 1012 is restrained from significant vertical displacement as it is contained in a 'cage' made of the substrate 1015 on the bottom and one or more deposited silicon 'fingers' 1017 on the top. More specifically, the pin 1012 can move only small amounts vertically and horizontally but is free to rotate. In some embodiments, the oxide 1015 may remain, and/or a portion of the finger 1012 may remain attached to the substrate 1015 resulting in the finger torsionally deforming during rotation of the plate 1005.

Embodiments disclosed herein leverage a microfabrication process flow and monolithically integrated piezoelectric thin films to create a robust solution with an example path to manufacture. While small scale piezoelectric sensors sometimes suffer from high noise due to dielectric loss within the film, embodiments herein may achieve breakthrough noise performance (12-15 dB lower than state of the art) due to the high compliance and sensitivity built into the structure. Innovative hot-wire anemometer type sensors that measure acoustic particle velocity directly have been demonstrated and are in the early stages of commercialization for specialized intensity measurement applications (H.- E. de Bree and J. W. Wind, "The acoustic vector sensor, a versatile battlefield acoustics sensor," in Proceedings of SPIE—The International Society for Optical Engineering, 2011). Foreign militaries have demonstrated aerial sniper detection drones using this technology. As thermal devices, these acoustic sensors (i) require continuous power draw which may prohibit the technology from being used in portable systems and (ii) have limited frequency range due to thermal time constants. Commercialized embodiments use frequency selective amplification to artificially extend the range to 10 kHz. The proposed technology solves these and other problems in the art. For example, the proposed technology here, in contrast to prior technologies, may have broad design space enabling designs that can operate up to, or beyond 200 kHz.

Example Embodiments and Simulations

Network Modeling of Multiple-Port, Multiple-Vibration-Mode Transducers and Resonators A modeling procedure is presented for multiple-port, multiple-vibration-mode transducers. Unique features of the procedure include the use of modal coordinates to describe deformations of the mechanical structure, the use of a network analog for each vibration mode of the structure, and the selection of modal velocity, rather than a particular physical velocity on the structure, as the mechanical flow variable in each modal network. Finite element analysis is used only to compute a discrete set of salient circuit parameters, with all other analysis and design computations performed using the networks. The approach is computationally efficient and assists with providing insights into the design of actuators and micromechanical resonators, where the generation and suppression of particular vibration modes may be important. A micromachined, multiple-port piezoelectric microphone with in-plane directivity is presented as a case study to demonstrate application of the procedure. Model verification is performed by comparing simulated and measured port-to-port transfer functions over a frequency range spanning several vibration modes of the device. The modeling procedure can address multiple-port sensor response to distributed loadings, selective excitation and suppression of modes in actuator applications, and mixed sensing and actuator applications such as the demonstrated port-to-port measurements.

I. Introduction

This embodiment discloses an efficient procedure for constructing a complete system model for multiple-vibration-mode, multiple-port transducers with arbitrarily complex geometries. The model is based on a modal coordinate transformation and subsequent construction of a network model for each vibration mode of the device, up to the highest mode of interest. Modal velocity, rather than a particular physical velocity on the structure, is the mechanical flow variable through each modal network. Each mode network contains multiple transformers which represent the multiple transduction ports of the physical system. In many cases, use of a network model and a finite element model are considered mutually exclusive. Either lumped approximations with limited accuracy are used in an electrical network analysis, or the more rigorous finite element model is used with all simulations completely contained within the finite element program. The former typically offers more design insight and computationally efficiency, while the advantage of the later is rigor and the ability to handle complex shaped structures. The proposed approach combines advantages of both. Only a discrete set of salient parameters are obtained from a finite element eigensolution simulation (i.e., modal analysis). Namely, these are modal masses, modal resonant frequencies, and transducer port transformer ratios defined, for piezoelectric transducers, as the short-circuit charge generated at the transducer port per unity input modal displacement. For capacitive transducers the transformer ratios are defined as the charge produced at the transducer port per unity modal displacement under constant bias voltage. For design of multiple port actuators (e.g., micromechanical resonators), the approach provides a systematic way to compute drive voltages that selectively generate vibration modes of interest while suppressing and minimizing spurious modes.

Figure 11A:
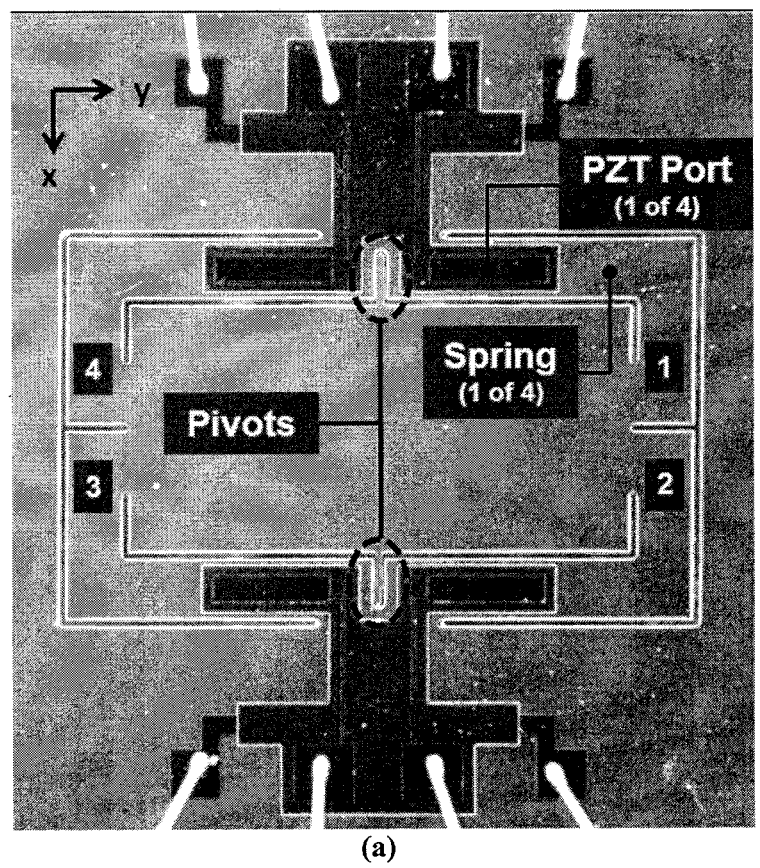
FIG. 11A is a micrograph of piezoelectric microphone in accordance with the description herein.
Figure 11B:
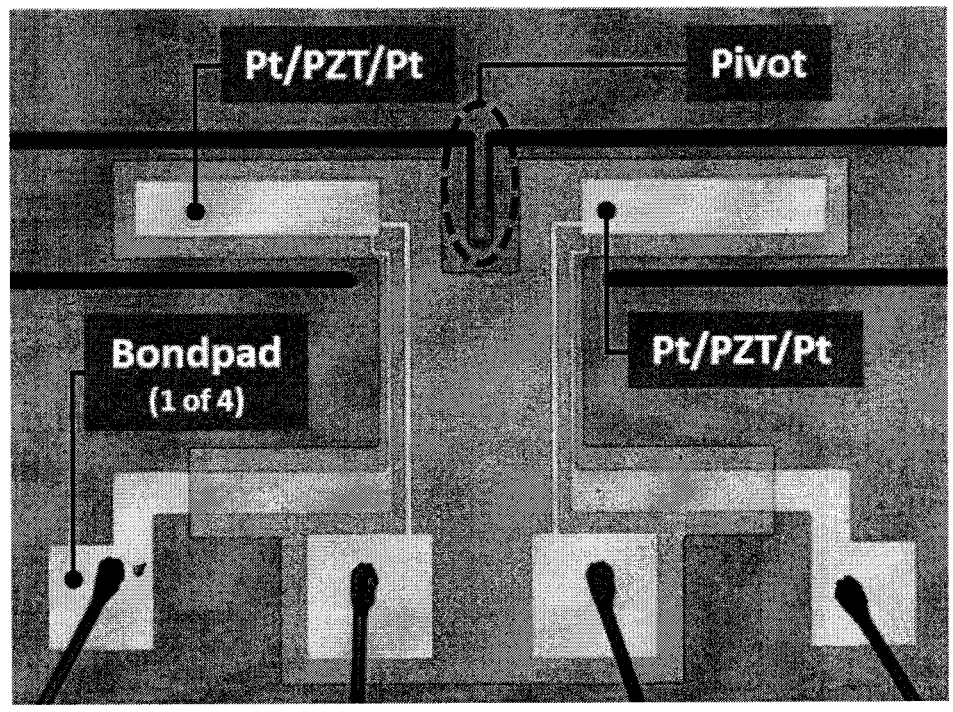
FIG. 11B is a micrograph of piezoelectric microphone in accordance with the description herein.
Figure 11C:
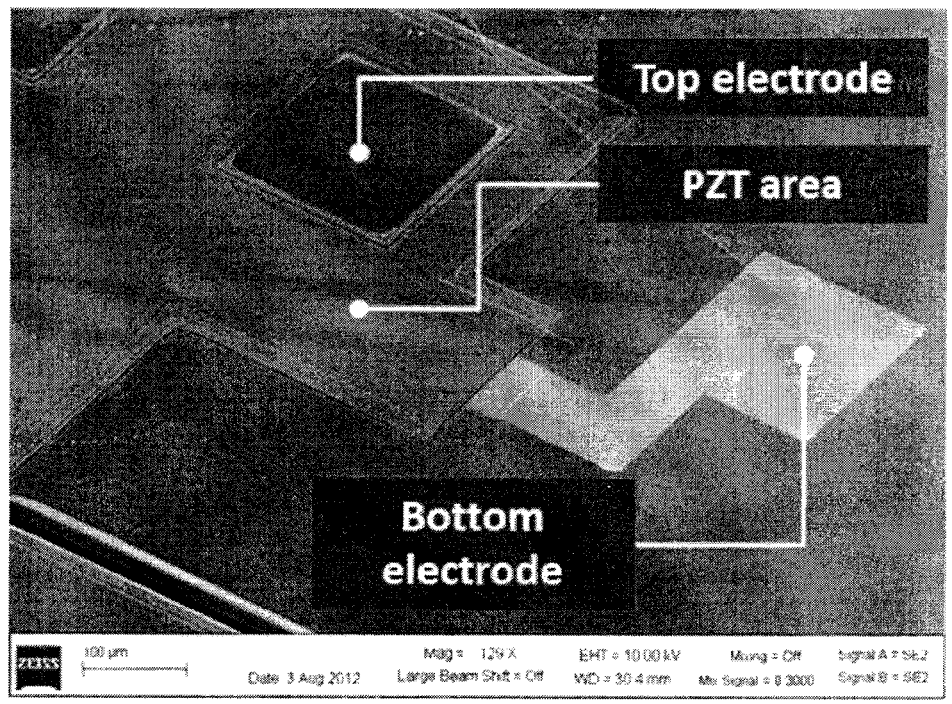
FIG. 11C is a micrograph of piezoelectric microphone in accordance with the description herein.
Figure 11D:
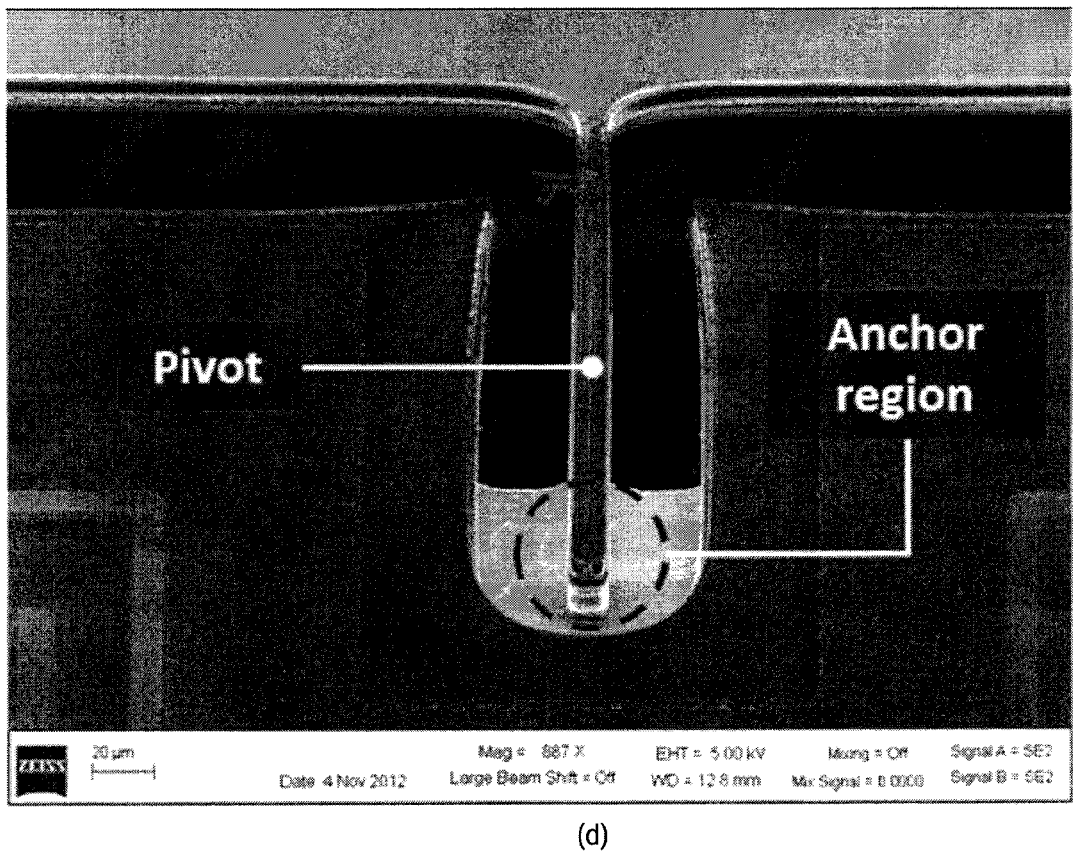
FIG. 11D is a micrograph of piezoelectric microphone in accordance with the description herein.
Figure 11E:
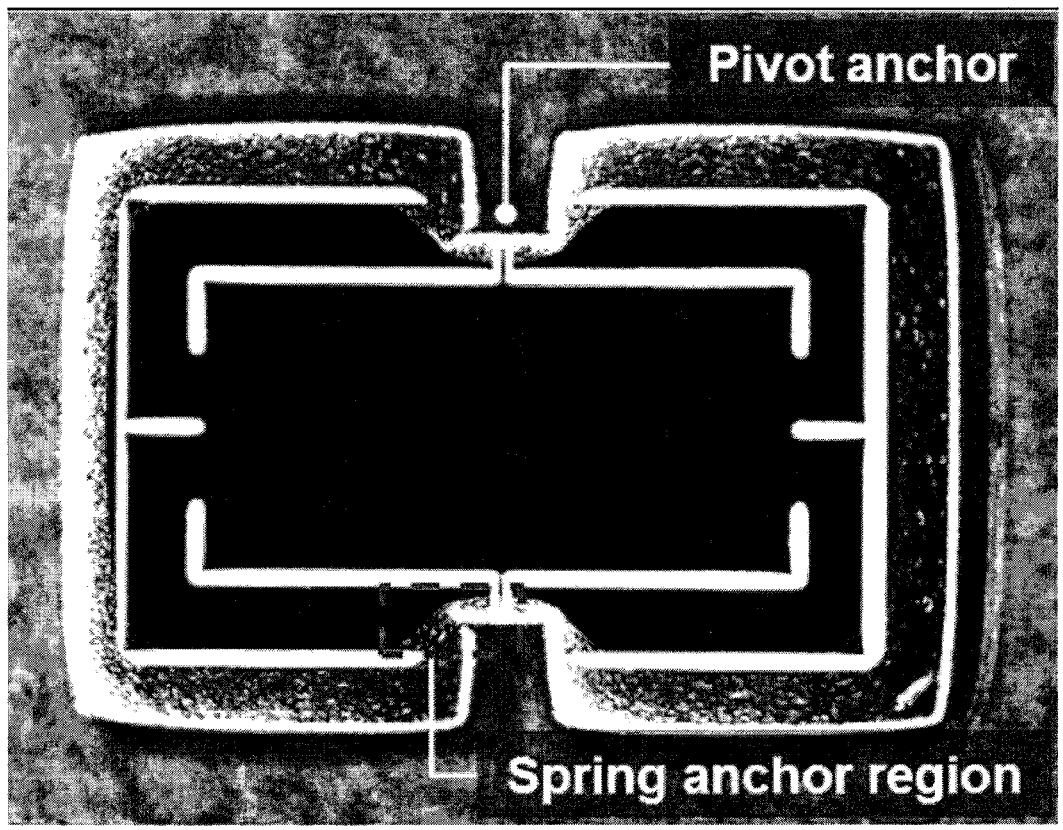
FIG. 11E is a micrograph of piezoelectric microphone in accordance with the description herein.
Figure 11F:
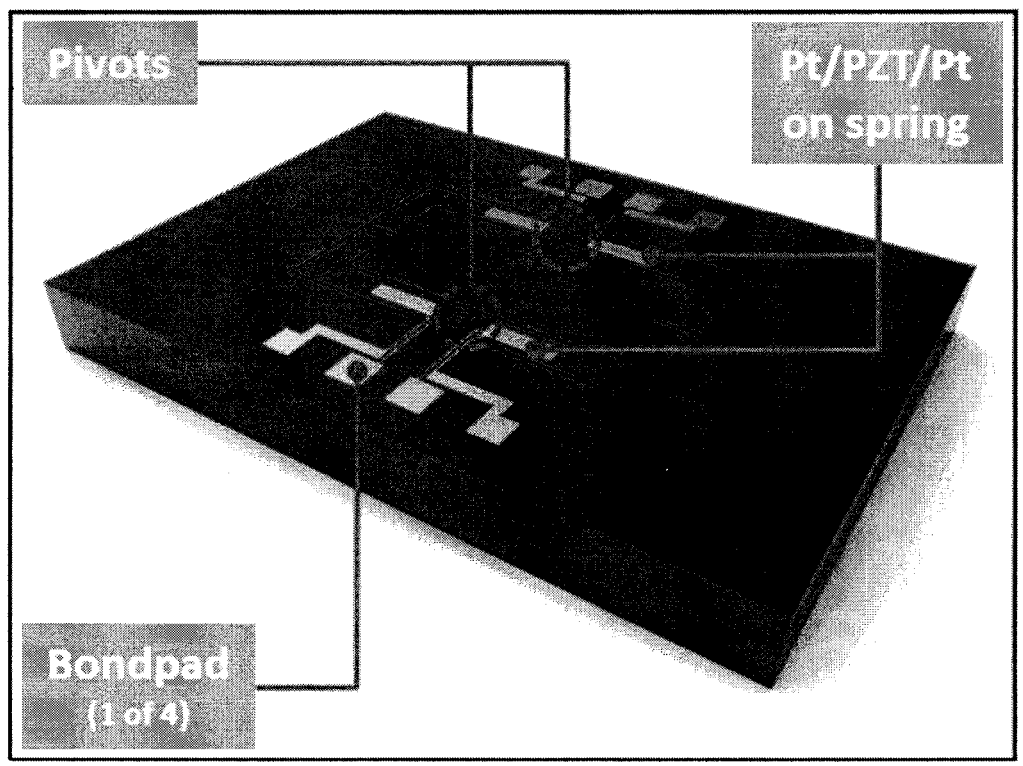
FIG. 11F is a isometric illustration of piezoelectric microphone in accordance with the description herein.

Description of Case Study Device:

A micromachined piezoelectric acoustic sensor with in-plane directivity is presented as a simple case study and for model verification purposes [M. L. et al., *Applied Physics Letters*, 102, 054109-4 (2013)]. The device, presented in FIG. 11A, is comprised of a rectangular beam that is designed to rotate about the x axis in response to sound pressure gradients along they axis. The beam rotates about the pivots labeled in FIG. 11A like a teeter-totter, with the four end-springs providing restoring force. The rectangular beam and the springs are etched from the same 20-μm-thick epitaxial silicon device layer of a silicon-on-insulator (SOI) wafer. Each of the four springs contains a piezoelectric coupling port near the spring anchor as labeled in FIG. 11A. The ports consist of a 1-μm-thick sol-gel deposited lead zirconate titanate (PZT) film in between top and bottom Ti/Pt electrodes. Coupling works in the 3-1 mode as bending of a 20-μm-thick silicon spring induces elongations and contractions of the thin film at the spring's top surface, in-turn resulting in a z-axis electric field or short-circuited charge across the electrodes. FIG. 11B is a zoomed-in micrograph near the base of two springs highlighting the pivot, the electrodes, and the routing of electrical signals out to bond pads near the edge of the chip. FIGS. 11C and 11D are scanning electron micrographs (SEMs) of the bond pad and pivot regions, respectively. A 3-D CAD rendering of the device is shown in FIG. 11F. Although the pivot may appear to be free floating in FIG. 11A, it is anchored to the bulk silicon substrate via the embedded oxide layer of the SOI wafer, as shown in FIG. 11D.

Modal analysis results, obtained using ANSYS, are presented in FIGS. 12A through 12G. The first vibration mode, which resembles a rocking teeter-totter, is the desired mode of operation. For acoustic frequencies where wavelength is large compared to the device dimension, this device mode is only responsive to $\partial P/\partial y$ pressure gradients and therefore has a dipole response to sound pressure. The sensitive axis of the dipole is the y-axis labeled in FIGS. 11 and 12. In this particular embodiment, all other higher-order modes are considered spurious since they are excited by omnidirectional pressure and pressure gradients other than the desired $\partial P/\partial y$ measurand. The presence of these modes can corrupt the desired directionality and add undesirable cross-axis sensitivity to the device response. Therefore, although the device is intended to operate in the first (rocking) mode, it is beneficial to be able to model and control spurious higher-order modes.

Advantages of Multiple Ports in Sensor Applications:

Multiple ports in this sensor application can serve to enhance signal-to-noise ratio (SNR) and suppress sensitivity to undesirable modes. Signals at ports one and two in FIG. 11A are complimentary to signals at ports three and four for first mode vibrations. All of the ports in FIG. 11A may have a floating ground. If open-circuit voltage signals at ports one and two are summed and subtracted from the sum of signals at ports three and four, a factor of $\sqrt{4}=2$ (or 6 dB) enhancement in the first mode SNR is realized. Further, this configuration suppresses signal sensitivity to second mode vibrations which are excited by the omnidirectional component of sound pressure. If port sensitivities can be matched to within one percent, forty decibels of second mode signal suppression can be achieved. In previous directional microphone designs with single port optical readout, complex fabrication procedures were required to increase the modal stiffness coefficient of the second mode and push its frequency outside the sensor frequency band of interest [R. N. et al., *Journal of the Acoustical Society of America*, 125, 2013-26 (2009)]. The proposed multiple sensing port approach has the advantage of simpler microfabrication with reduced processing steps. In future sensor embodiments, multiple ports may prove useful for combined sensing and actuation to implement closed loop feedback altered dynamics and/or force feedback operation, which offers the possibility to selectively stiffen and soften modes of interest and improve dynamic range [B. E. Boser, R. T. Howe, *IEEE Journal of Solid-State Circuits*, 31, 366-75 (1996); M. Lemkin, B. E. Boser, A, *IEEE Journal of Solid-State Circuits*, 34, 456-68 (1999)].

Questions a Complete Model should Answer:

To explore all cases above, a rigorous model should be able to quantify the electromechanical coupling and sensitivity at each transducer port at any frequency. An ideal model should accurately predict port sensitivities for any type of the sensor input (e.g., acceleration or pressure) across a wide frequency band encompassing multiple vibration modes. As a final example illustrating the application of such a model to the sensor system in FIG. 11, it is noted that pressure gradients resulting from sound incident in the x-direction excite spurious rotational modes three and four depicted in FIGS. 12A through 12G, which degrades cross axis rejection. The proposed network model presents a procedure for quantifying such effects at the design stage.

The model presented in this report is also ideal for studying multi-port actuators and in particular multi-mode resonators (e.g., micromechanical resonators addressing RF-MEMS applications). Higher-order vibration modes are deliberately used in RF-MEMS to achieve high frequency and/or high Q oscillations [K. E. Wojciechowski et al., *High-Q Aluminum Nitride MEMS Resonators, Transducers*, 2009, Denver, Colo., USA, 2009; G. Piazza et al., *Sensors and Actuator A*, 111 71-8 (2004); P. J. Stephanou, A. P. Pisano, *IEEE Ultrasonics Symposium*, 2401-4 (2006); G. Piazza, P. J. Stephanou, A. P. Pisano, *Solid-State Electronics*, 51, 1596-608 (2007)]. The model presented here presents a systematic way to quantify and control the participation and generation of modes in a vibration by controlling the amplitude and phase of excitation voltages at multiple transducer ports. Another example of multiple-port MEMS transducers is RF-MEMS accelerometers described by Olsson et al. that detect shifts in modal resonant frequencies of a structure due to in plane accelerations [R. H. Olsson et al., *Journal of Microelectromechanical Systems*, 18, 671-8 (2009)]. These structures use multiple aluminum nitride (AlN) piezoelectric ports to generate and detect vibration of a tuning fork structure. Yet another example of multiple-port MEMS are multiple electrode capacitive micromachined ultrasonic transducers (CMUTs) presented by Degertekin et al., which utilize exterior electrodes of a CMUT for biasing and interior electrodes for dynamic actuation and ultrasonic detection [R. O. Guldiken et al., *IEEE Transactions on Ultrasonics, Ferroelectrics, and Frequency Control*, 55, 2236-344 (2008); R. O. Guldiken et al., *IEEE Transactions on Ultrasonics, Ferroelectrics, and Frequency Control*, 56, 1270-6 (2009); R. O. Guldiken, J. McLean, F. L. Degertekin, *IEEE Transactions on Ultrasonics, Ferroelectrics, and Frequency Control*, 53, 483-91 (2006); N. A. Hall et al., *IEEE Ultrasonics Symposium* 2004, pp. 260-3]. In what follows, the modeling procedure is described and model verification experiments are presented in which simulated and measured port-to-port transfer functions are compared across a broad frequency range encompassing multiple vibration modes of the device structure in FIG. 11A.

II. Description of Model

The modeling procedure is based on two steps: (i) modal analysis and modal coordinate decomposition, and (ii) creating a network for each mode with modal velocity the mechanical flow variable in the network. Multiple transformers are used in each modal network, with each transformer corresponding to a transduction port of the physical system.

Modal Coordinate Transformation:

The time dependent displacement $\vec{u}(x,y,z,t)$ of a mechanical structure from equilibrium may be expressed as a superposition of vibratory modes as $$\vec{u}(x, y, z, t) = \sum_{i=1}^{M} \vec{\psi}_i(x, y, z) \eta_i(t) \qquad (1)$$

where $\vec{\psi}_i$ is the i-th mode shape of a system. $\vec{\psi}_i$'s are the shape of free vibration eigensolutions to the elastodynamic equations of motion governing the structure with all transducer ports short-circuited (i.e., no coupling to the electrical domain). $\eta_i$'s are scalar functions of time, and M is the chosen number of modes to retain in the superposition analysis. This approach breaks down the structure's vibration into a finite degree of freedom system through a transformation to modal coordinates, $\eta_i$. A powerful result of normal mode analysis from vibration theory is mode orthogonality. In modal coordinates, elastodynamic equations of motion are decoupled to yield simple second order equations of vibration, $$\ddot{\eta}_i + 2\varsigma_i \omega_{n,i} \dot{\eta}_i + \omega_{n,i}^2 \eta_i = F_i \qquad (2)$$

where $F_i$ is a scalar called a modal force and may be evaluated as $$F_i(t) = \iiint \vec{\psi}_i(x,y,z) \cdot \vec{f}_b(x,y,z,t) dV \qquad (3)$$

where $\vec{f}_b$ is any body force per unit volume acting on the structure. For a system with a discrete rigid proof mass responding to acceleration inputs (e.g., many MEMS accelerometers [J. Chae, H. Kulah, K. Najafi, *Journal of Microelectromechanical Systems*, 14, 235-42 (2005); C. Lu, M. Lemkin, B. E. Boser, *IEEE Journal of Solid-State Circuits*, 30, 1367-73 (1995); N. C. Loh, M. A. Schmidt, S. R. Manalis, *Journal of Microelectromechanical Systems*, 11, 182-7 (2002); C.- H. Liu, T. W. Kenny, *Journal of Microelectromechanical Systems*, 10, 425-33 (2001)]), $F_i$ is equal to the dot product of the input acceleration with the modal displacement vector evaluated at the center of mass, $F_i = \vec{\psi}_i(x_c,y_c,z_c) \cdot \vec{a}(t)$. For a system responding to pressure loading $P(x,y,z,t)$ across the surface of the structure (e.g., MEMS microphones [A. Dehe, *Sensors and Actuators A*, 133, 283-7 (2007); P. R. Scheeper et al., *Journal of Microelectromechanical Systems*, 12, 880-91 (2003); P. R. Scheeper, W. Olthuis, P. Bergveld, *Sensors and Actuator A*, 40, 179-86 (1994); D. Hohm, G. Hess, *Journal of the Acoustical Society of America*, 85, 476-80 (1989); D. T. Martin et al., *Journal of Microelectromechanical Systems*, 16, 1289-302 (2007)]), $$F_i(t) = \iint \vec{\psi}_i(x,y,z) \cdot \vec{n} P(x,y,z,t) dA \qquad (4)$$

where $\vec{n}$ is a unit vector normal to the surface of the structure. Suffice to say that $F_i$ is a scalar that depends on external loading and is straightforward to compute, be it analytically or computationally. Challenges that might otherwise arise from computing integrals in (3) and (4) are easily avoided using most any modern finite element software that can output these parameters. The directional microphone mode shapes presented in FIGS. 12A through 12F are obtained using finite element modeling software. ANSYS, the software used in this study, presents mass normalized modes which, by definition, means that mode shapes $\vec{\psi}_i$ have been scaled such that the modal masses, i.e., the coefficients preceding $\ddot{\eta}_i$ in (2), are unity. In general, modal mass $m_i$ is provided by $$m_i = \iiint \rho(x,y,z) \vec{\psi}_i(x,y,z) \cdot \vec{\psi}_i(x,y,z) dV \qquad (5)$$

The above analysis procedure summarized by (1) through (5) is an efficient and powerful technique commonly applied in the analysis of purely mechanical vibratory systems [J. H. Ginsberg, *Mechanical and Structural Vibrations: Theory and Applications*, New York: John Wiley & Sons; 2001; V. B. Bokil, U. S. Shirahatti, *Journal of Sound and Vibration*, 173, 23-41 (1994); F. Daneshmand, E. Ghavanloo, *Journal of Fluids and Structures*, 26, 236-52 (2010)].

Energy Coupling Using Network Analogs:

To incorporate multiple port electromechanical coupling, an approach is used that combines the normal mode coordinate system with network analogs which are pervasive in the study of energy coupling transducers [H. A. C. Tilmans, *Journal of Micromechanics and Microengineering*, 6, 359 (1996); H. A. C. Tilmans, *Journal of Micromechanics and Microengineering*, 7, 285 (1997); S. Roundy, *Journal of Intelligent Materials Systems and Structures*, 16, 809-23 (2005); S. B. Horowitz et al., *Journal of Micromechanics and Microengineering*, 16, 174-81 (2006); M. Ferrari et al., *IEEE Transactions on Instrumentation and Measurement*, 55, 2096-101 (2006); M. L. Kuntzman et al., *Journal of Microelectromechanical Systems*, 20, 828-33 (2011); M. D. Williams et al., *Journal of Microelectromechanical Systems*, 21, 270-83 (2012)]. Equation (2) may be represented using a simple second-order RLC network model as shown in the right half of FIG. 13, with $\dot{\eta}_i$ (i.e., the modal velocity) as the mechanical flow variable through the network and $F_i$, the modal force, as the effort variable in the network. Coupling of energy to the piezoelectric ports is represented with the transformers shown in FIG. 13, each transformer and electrical port in the network corresponding to a physical piezoelectric port labeled in FIG. 11A. The symbol $\phi_{ij}$ is used to denote the transformer ratio characterizing electromechanical coupling at the j-th port due to structural deformation of the i-th vibration mode. Voltage and current at each port follow the same notation. Specifically, $V_{ij}$ and $i_{ij}$ denote voltage and current, respectively, generated at the j-th port due to motion of the i-th mode. Selection of $F_i$ and $\eta_i$ as mechanical port variables predefines $\phi_{ij}$ as the short-circuit charge generated at port j per a mechanical modal displacement $\eta_i$ of unity. Each port j is also characterized by an electrical capacitance under blocked mechanical conditions, $C_{eb,j}$, as shown in the network of FIG. 13.

Figure 12A:
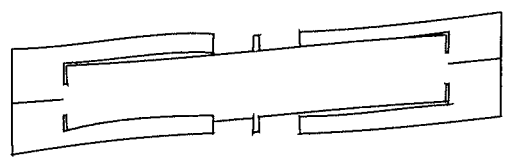
FIGS. 12A-12G illustrate multiple mode shapes and natural frequencies of the first six modes of an acoustic sensor in accordance with the description herein.
Figure 12B:
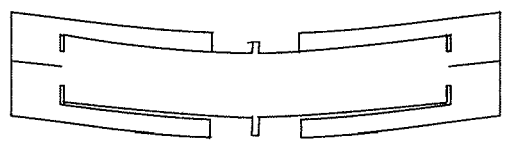
Figure 12C:
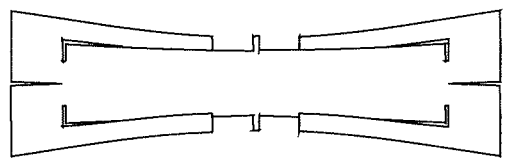
Figure 12D:
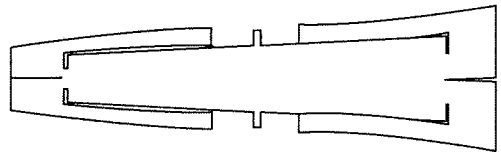
Figure 12E:
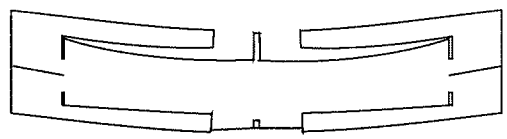
Figure 12F:
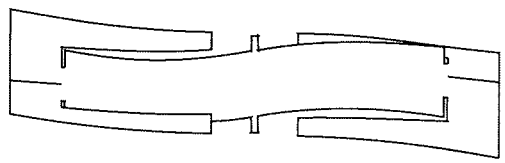
Figure 12G:
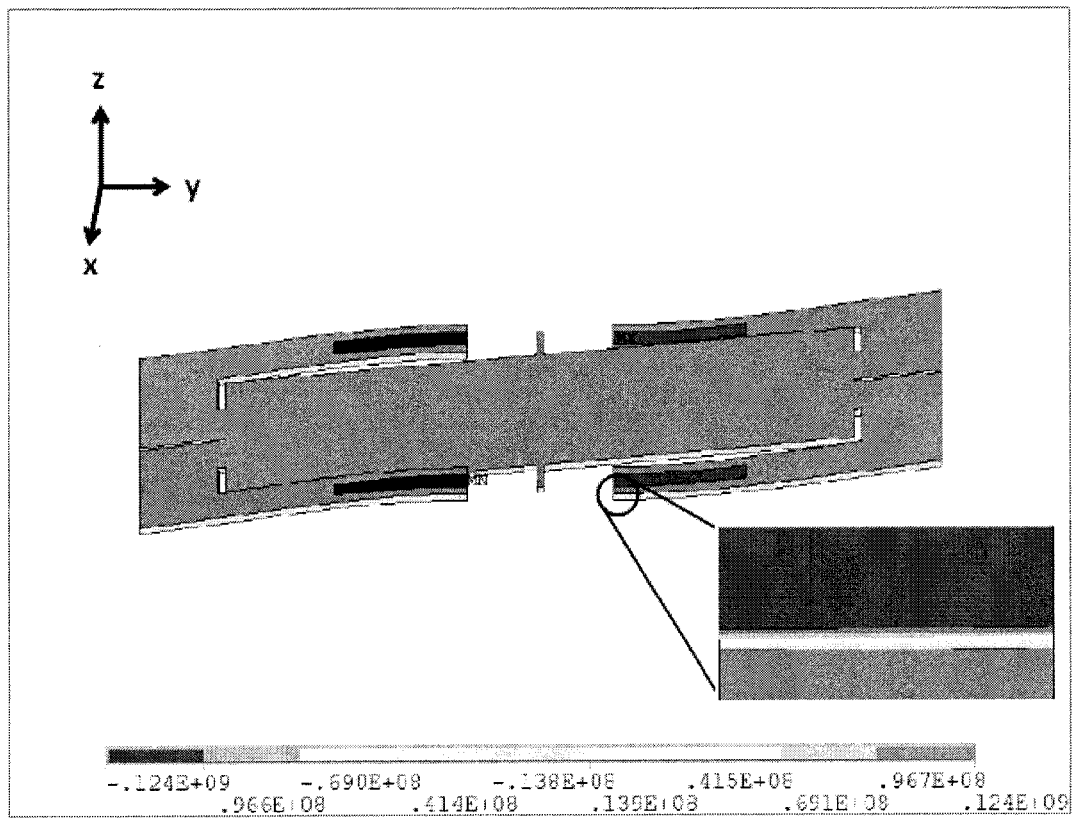
Figure 13:
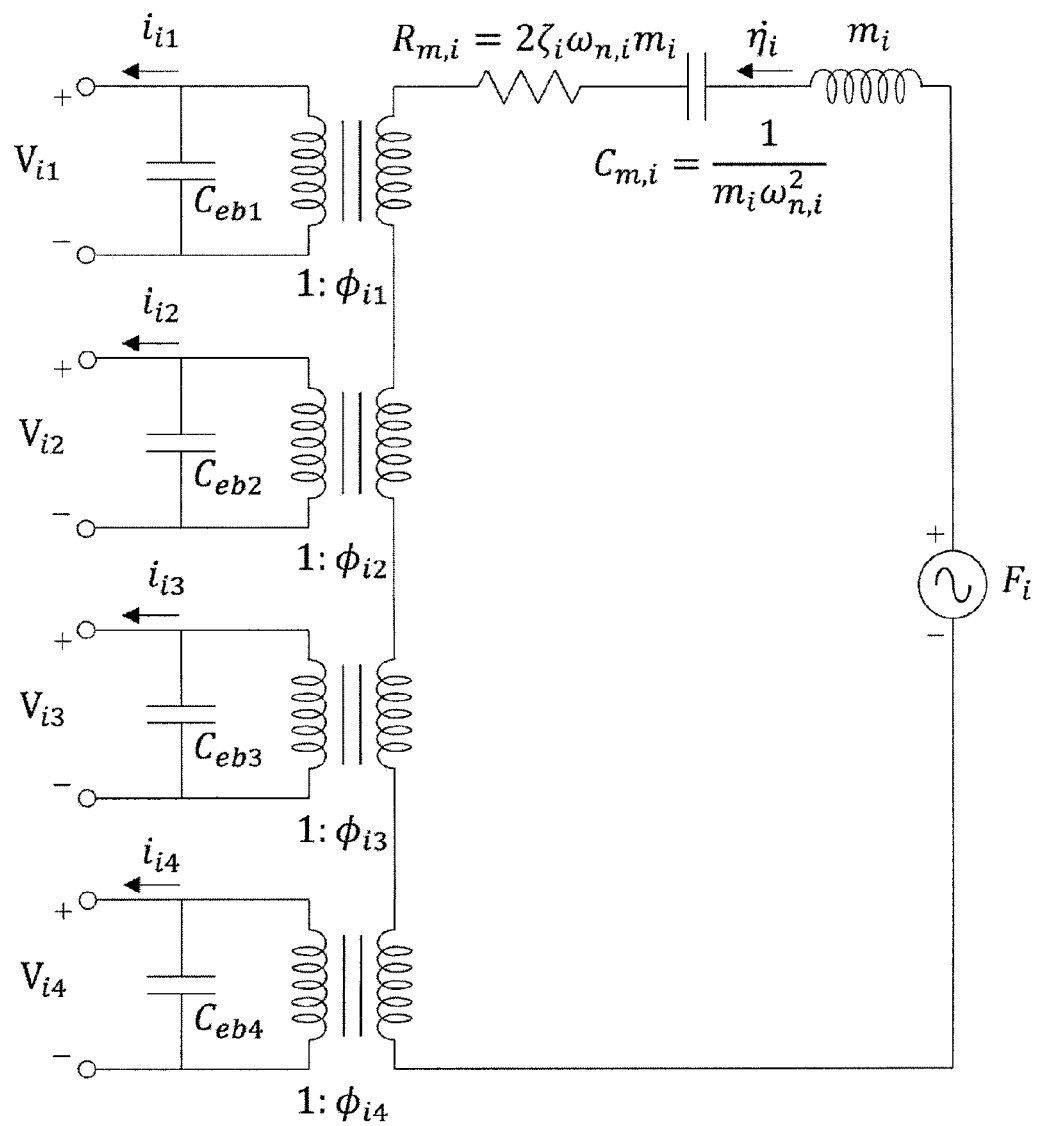
FIG. 13 is a network model for a mode of an acoustic sensor in accordance with the description herein.

FIG. 13 presents a model for a system with four transducer ports (e.g., the system described in FIG. 11). Consider the first vibration mode (i=1 in FIG. 13). For this particular mode shape of the physical system, depicted in FIG. 12A, each piezoelectric port has unique coupling depending on the location of the piezoelectric thin film element on the structure and, in particular, the mechanical strain field at the location of the film. With all electrical ports in FIG. 13 shorted, a physical modal displacement $\eta_1 = 1$ results in a short-circuited charge $q_{1j}$ across each port. This short-circuit charge at each port is, by definition, numerically equal to $\phi_{1j}$ and is readily obtained from a finite element modal analysis of the physical structure. ANSYS, for example, enables integration of piezoelectric analysis with modal analysis. FIG. 12G shows the electric potential generated at port 1 resulting from $\eta_1 = 1$ under an open terminal condition.

Each modal analysis result presented in FIGS. 12A-12G provides complete information needed to construct the network for that mode. The critical circuit parameters are: modal mass $m_i$ (set to unity), mode compliance $C_{m,i}$ (equal to $1/\omega_{n,i}^2$), and all of the port transformer values $\phi_{ij}$ which are numerically equal to the short-circuit charge at each port as provided by ANSYS resulting from the modal displacement of unity. Table 1 summarizes all of the salient network parameters for the first six vibration modes—all obtainable from the six discrete eigensolutions produced by ANSYS and summarized in FIGS. 12A-12G. Piezoelectric material properties for the microfabrication processing conditions used in this work have been experimentally determined using the method described in [D. Kim et al., *Journal of Microelectromechanical Systems*, 22, 295-302 (2013)], and these properties were used in the finite element model. Mechanical damping is not provided as part of the modal analysis, but if desired can be modeled from first principles in the design stage for each modal displacement profile. Alternatively, a modal damping ratio $\varsigma_i$ can be chosen for each mode in an ad-hoc manner and/or later fitted to experimental data. In either case, mechanical resistance $R_{m,i}$ of each mode is equal to $2\varsigma_i\omega_{n,i}$.

To illustrate utilization of the model, several analysis examples are considered:

(i) Sensing:

To analyze the response of the sensor in FIG. 11 to acoustic plane waves arriving in the y-direction, consider that pressure loading is provided by $P(y,t)=P_0 e^{j(\omega t - ky)}$ with $P_0$ and k the amplitude and wavenumber of the incident sound. Taking y=0 as the pivot location, all modal forces $F_i$ can be computed following (4), most easily performed within the FEA software package. The network for each mode can then be analyzed independently for any parameter of interest, and the results then superimposed. For example, if the short-circuit charge is sensed at all of the ports shown in FIG. 11a, as would be the case when using charge amplifiers with ideally zero input impedance, then each mode displacement $\eta_i$ is given by $$\eta_i = \frac{F_i C_{m,i}}{1 - r_i^2 + 2j\varsigma_i r_i}, \quad (6)$$

$$r_i = \frac{\omega}{\omega_{n,i}}$$

The total charge signal at a particular port j would then be given as the superposition of the charge signal generated by each mode, or $$q_{sc,j} = \phi_{1j}\eta_1 + \phi_{2j}\eta_2 + \phi_{3j}\eta_3 + \ldots \phi_{Mj}\eta_M = \sum_{i=1}^{M} \phi_{ij}\eta_i \quad (7)$$

If instead open-circuit voltages are sensed, FIG. 13 makes clear that each mode is electromechanically stiffened by $C_{eb,j}/\phi_{ij}^2$ terms, which physically arise due to storage of electrical potential energy in the form of charge separation at each piezoelectric port. Kim, et al, recently used similar effects to tune RF oscillators, in which case external capacitors were connected to ports in an AlN MEMS resonator [B. Kim, R. H. Olsson, K. E. Wojciechowski, *Transducers* '11, Beijing, China, 2011, pp. 502-5]. The proposed model presents a convenient method for quantifying such effects across multiple vibration modes.

(ii) Actuation:

The network in FIG. 13 can also be used to efficiently model the response of the structure to actuation voltages applied at the ports. Most generally, voltage inputs of different amplitude and phase can be applied at each port, and the complex amplitude of the voltage input at each port will affect the extent to which a particular vibration mode is generated or suppressed. Assuming zero external loading, the modal force, $F_i$ in FIG. 13 is zero for each mode. Further, there can be only physical voltage, $V_j$, applied at each port. Referring to FIG. 13, the modal force generated by application of a voltage $V_1$ at port one is $\phi_{i1}V_1$, which results from transferring the applied signal to the right side of the transformer. The total modal force generated on the first mode, which determines the participation of mode 1 in the overall response, is then $$F_1 = \phi_{11}V_1 + \phi_{12}V_2 + \ldots \phi_{1N}V_N = \sum_{j=1}^{N} \phi_{1N}V_N \quad (8)$$

where N is the number of ports of the system. More generally, the complete set of modal forces is computed as $$\begin{bmatrix} F_1 \\ \vdots \\ F_M \end{bmatrix} = \begin{bmatrix} \phi_{11} & \cdots & \phi_{1N} \\ \vdots & \ddots & \vdots \\ \phi_{M1} & \cdots & \phi_{MN} \end{bmatrix} \begin{bmatrix} V_1 \\ \vdots \\ V_N \end{bmatrix}, \quad (9)$$

or $$F_i = \phi_{ij}V_j$$

Equation (9) represents an M×N set of equations, and $\phi_{ij}$ is a system matrix that completely characterizes the mapping of complex actuation voltages to the modal forces acting to drive each mode. In an analysis scenario, modal forces $F_i$ resulting from a particular set of actuation voltages $V_j$ can be computed using (9). As a design scenario, one may desire to discover the port actuation voltages that produce a desired set of modal forces, $F_i$, and to do so one would multiply (9) by the inverse of $\phi_{ij}$, denoted $\Phi_{ji}=\phi_{ij}^{-1}$. i.e., $$V_j = \Phi_{ji}F_i \quad (10)$$

Equation (10) can be solved so long as $\Phi_{ji}$ is computable. A necessary but insufficient condition is that N be at least equal to or greater than M (i.e., at least as many actuation ports are required as the number of modes one wishes to control the actuation of). Because (10) enables the selection of modal forces, the symbol $\Phi_{ji}=\phi_{ij}^{-1}$ is referred to as the mode selectivity matrix of a multi-port transducer system. Mode suppression is important, for example, in the design and operation of high frequency micromechanical resonators [K. E. Wojciechowski et al., *High-Q Aluminum Nitride MEMS Resonators, Transducers,* 2009, Denver, Colo., USA, 2009; G. Piazza et al., *Journal of Microelectromechanical Systems*, 15, 1406-18 (2006)]. Equation (10) may also find application in the design of closed loop force-feedback sensor systems, where it is desired to apply feedback to certain vibration modes but not to others (e.g., manipulating only a pair of system poles while leaving others unaffected).

(iii) Port to Port Transfer Functions:

For applications such as chemical sensing [G. Fischerauer et al., *IEEE Ultrasonics Symposium* 1996, pp. 439-42; O. Tigli, M. E. Zaghloul, *IEEE Sensors Journal,* 7, 219-27 (2007)], in some embodiments it may be advantageous to use a multiple port transducer to actuate with one port and sense with another, while monitoring changes in the port-to-port transfer function (TF) that result from detection of a particular agent. Port-to-port transfer functions are readily simulated using the networks summarized in FIG. 13. For example, the transfer function between charge measured at port two and an applied actuation voltage at port one is determined by solving for $q_2/V_1$ for each modal network individually and superimposing results. For all ports shorted except port one, $q_2$ due to actuation voltage $V_1$ is provided by $$\frac{q_{sc,2}}{V_1} = \sum_{i=1}^{M} \frac{\phi_{i1}\phi_{i2}C_{m,i}}{1 - \left(\frac{\omega}{\omega_{n,i}}\right)^2 + 2j\varsigma_i\left(\frac{\omega}{\omega_{n,i}}\right)} \quad 11$$

Model Verification

Figure 14:
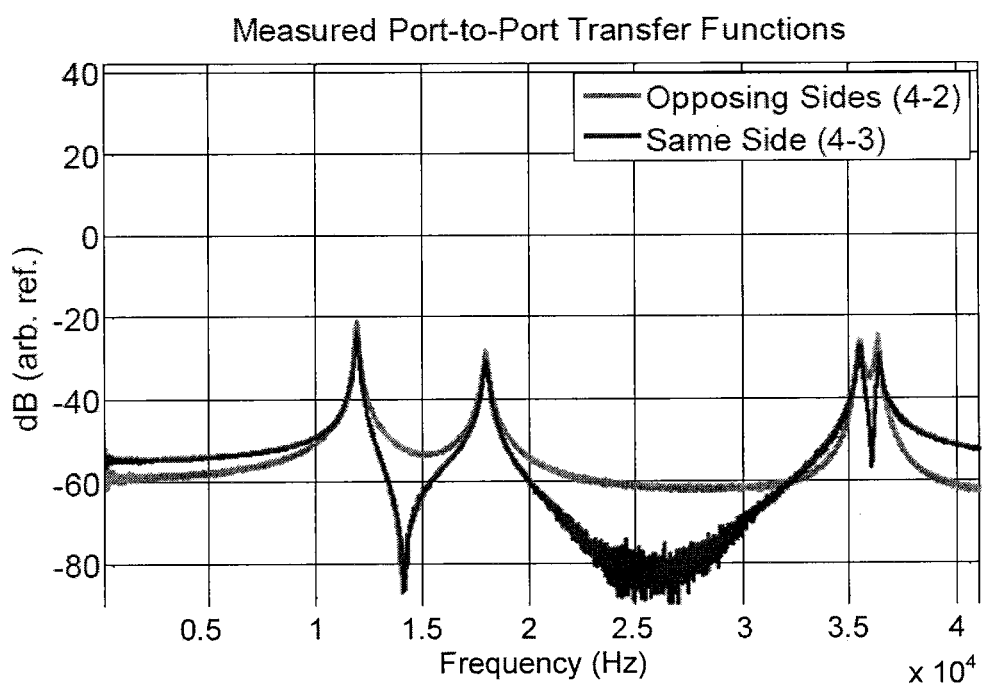
FIG. 14 is a graph representing measured transfer functions between ports on an acoustic sensor in accordance with the description herein.
Figure 15:
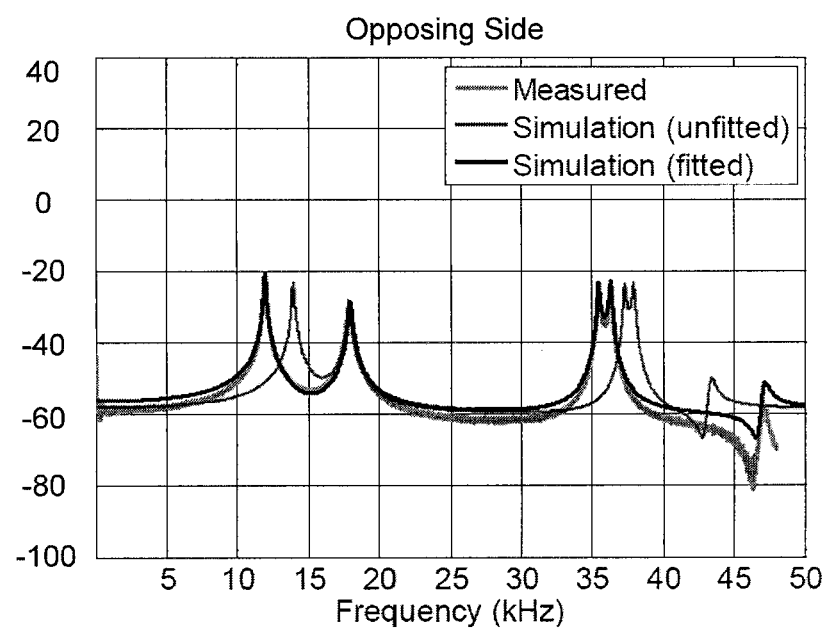
FIG. 15 is a graph representing measured and simulated transfer functions on an acoustic sensor in accordance with the description herein.
Figure 16:
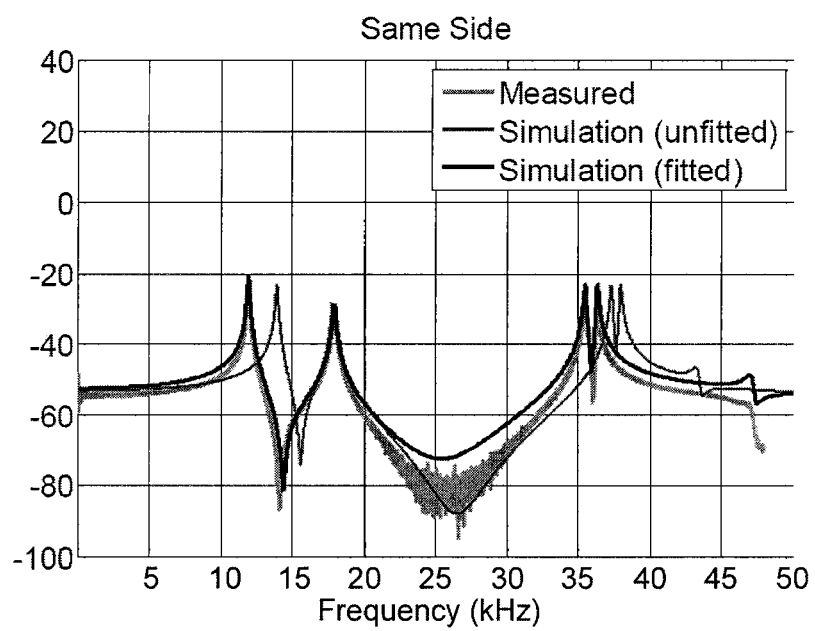
FIG. 16. is a graph representing measured and simulated transfer functions on an acoustic sensor in accordance with the description herein.
Figure 17:
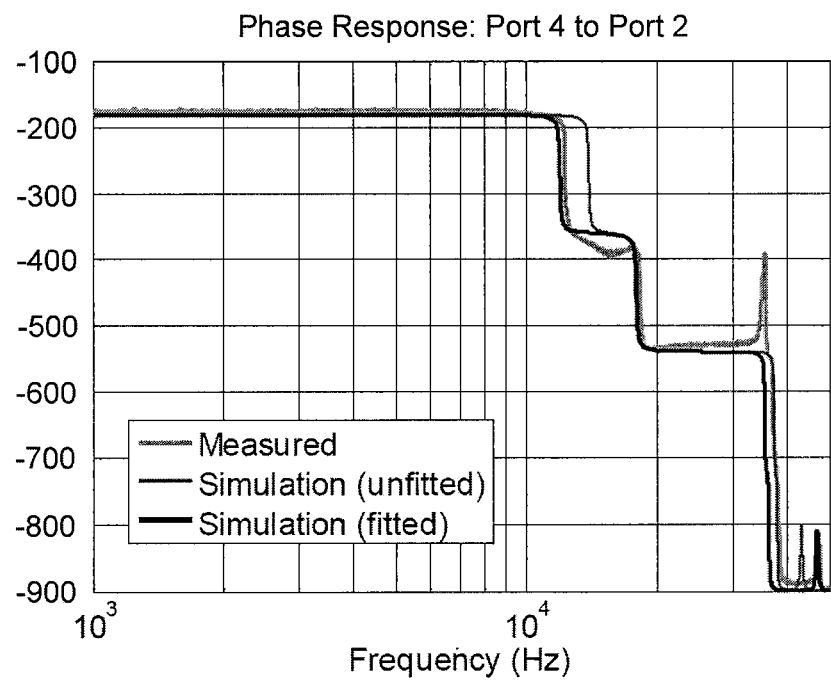
FIG. 17. is a graph representing measured and simulated phase response between ports on an acoustic sensor in accordance with the description herein.

Model verification is performed by comparing simulated port-to-port transfer functions (TFs) with measured TFs for the structure in FIG. 11A. A broadband white-noise input voltage was applied at port four while the open-circuit voltage was measured at port two. A high input impedance non-inverting amplifier (op amp model TI TLE2072, 10-MΩ input impedance, and 100• and 1-• gain resistors to provide 11× closed-loop voltage gain) was used to measure the voltage at port two, and the 11× gain is later discounted for presentation of results. The fast Fourier transform (FFT) of the port two signal is normalized to the FFT of the input spectrum at port four to obtain the measured amplitude transfer function presented in FIG. 14. The procedure was automated and performed using the bin centers feature of the Prism dScope Series III audio analyzer. The port-four-to-port-three (4-3) TF was also measured and is presented in FIG. 14. Both TFs were simulated using the network in FIG. 13 with circuit parameters summarized in Table 1. FIGS. 15 and 16 present a comparison of measured and simulated 4-2 and 4-3 TFs, respectively. Two simulations are presented for each case, one using the modal resonance frequencies directly from the finite element model and one using resonant frequencies that have been fitted to correspond to peak frequencies in the measured data. Both sets of modal resonance frequencies are summarized in Table 1. The presented model accurately predicts the measured response with high quantitative accuracy over a broad frequency range spanning more than four vibration modes of the device. The phase of the 4-2 TF was also measured, using a National Instruments PXI-4461 dynamic signal analyzer and a LabVIEW frequency sweep virtual instrument (VI), and presented alongside simulation results in FIG. 17. Again, network simulation shows highly accurate results across a frequency range covering five vibration modes of the device. The complex interactions of translation and rotational modes in FIG. 12A through 12G that give rise to the differences in the measured 4-2 and 4-3 TFs are captured by the model.

As noted from FIG. 11A, the 4-2 TF is one in which actuation and detection are on opposing sides of the pivot while actuation and detection are on the same side of the pivot for the 4-3 TF. In light of this and the mode shapes presented in FIGS. 12A through 12G, some interesting differences of the measured TFs in FIG. 14 are noted. For the opposing-side case, first and second mode contributions are out of phase at frequencies to left of $f_{n,1}$ while they are in phase for the for same-side case. This explains why the 4-2 TF is lower in amplitude than the 4-3 TF at DC. To the right of $f_{n,1}$, the phase of the first mode shifts 180 degrees and first and second modes are in phase for the 4-2 TF and out of phase for 4-3 TF. This explains the anti-resonance in the 4-3 case and the absence of an anti-resonance in the 4-2 case. Similar reasoning explains the difference in the TFs near and in-between modes three and four (i.e., between 35 kHz-37 kHz) in FIG. 14.

In this particular case-study, damping was not modeled but rather fitted. The Q of each resonance peak was extracted from the measured TF data and used in the networks of FIG. 13 to generate the simulation. Finally, although not discussed in this report, modeling of direct port to port capacitive coupling predicts a level of −60 dB which is, coincidentally, near the same level as motional coupling in between resonances. The direct port to port coupling is due to the insulating oxide and conductive epitaxial silicon plane which resides beneath the piezoelectric ports to form additional parasitic capacitors. This direct coupling has no frequency dependence over the measurement range presented. It has also been included in the simulation results in FIGS. 15-17. For clarity it is noted that the port to port transfer function measurements are not pertinent to the fundamental operation of the piezoelectric microphone device presented. Rather, this measurement and device were chosen as a means to illustrate verification of the device model.

Conclusion

A modeling procedure has been disclosed that provides a conceptual framework for integrating FEM results into a network model for multiple-mode, multiple-port transducers and resonators. The model combines the advantage of computationally efficiency of simple networks with FEA's ability to model complex geometries and multiple vibration modes. Only a discrete set of essential parameters are obtained from ANSYS through modal analysis which serve as a complete system description upon insertion into multiple port modal networks. The networks completely map all electrical port variables to each other and to external loading for complete input/output (I/O) characterization. Subsequent calculations (e.g., sensor response under distributed loads or port to port transfer functions) can be performed using computationally efficient circuit simulation tools. In addition to computational efficiency, the demonstrated model also yields design insights for actuators and resonators. Specifically, equation (10) enables one to discover a set of port voltages that produce a desired set of modal forces, which in turn controls the participation and suppression of modes in the resonator response. A directional multiple-port piezoelectric microphone was presented as a case study, and quantitative accuracy of the model was verified by comparing amplitude and phase spectra of simulated and measured port-to-port transfer functions. Although piezoelectric transduction was the focus in this disclosure, the modeling procedure may be equally applicable to linear analysis of capacitive transducers, in which case the transformer ratios depend on bias voltage. The presented procedure may find application in the field of advanced sensors and RF-MEMS. As a final note, the network models in FIG. 13 that describe each mode are also readily converted to a complete state-space description if desired. In this case, a choice of state variables could consist of charge across each port capacitor, modal displacement η, and modal velocity η̇.

TABLE I

SUMMARY OF NETWORK PARAMETERS

| Mode #: | Transformer ratio, φ | | | | ANSYS Natural Frequencies (kHz) | Fitted Natural Frequencies (kHz) |
|---|---|---|---|---|---|---|
| | Port #1 | Port #2 | Port #3 | Port #4 | | |
| 1 | −3.98e−2 | −3.98e−2 | 3.98e−2 | 3.98e−2 | 13.9 | 12.0 |
| 2 | 3.99e−2 | 3.99e−2 | 3.99e−2 | 3.99e−2 | 17.9 | 18.0 |

TABLE I-continued

SUMMARY OF NETWORK PARAMETERS

| Mode # | Transformer ratio, φ | | | | ANSYS Natural Frequencies (kHz) | Fitted Natural Frequencies (kHz) |
|---|---|---|---|---|---|---|
| | Port #1 | Port #2 | Port #3 | Port #4 | | |
| 3 | −6.61e−2 | 6.61e−2 | 6.61e−2 | −6.61e−2 | 37.3 | 35.5 |
| 4 | −6.71e−2 | 6.71e−2 | −6.74e−2 | 6.73e−2 | 38.0 | 36.3 |
| 5 | 2.46e−2 | 2.46e−2 | 2.46e−2 | 2.46e−2 | 43.4 | 47.1 |
| 6 | −4.73e−2 | −4.73e−2 | 4.73e−2 | 4.73e−2 | 64.5 | 64.5 |

Micromachined Piezoelectric Microphones with in-Plane Directivity

Microphones are one of the hottest growth areas of MEMS with 1-billion units shipped globally in 2011 and 2.9 billion anticipated in 2015. (J. Bouchard, IHS iSuppli Special Report—MEMS Microphones, 2011) The majority of MEMS microphones are omnidirectional. Directional microphones have been shown to benefit source localization and improve speech clarity in noisy environments (A. M. Amlani et al., *Int. J. Audiol.* 45, 319-330 (2006); P. J. Blamey et al., *J. Am. Acad. Audiol.* 17(7), 519-530 (2006); B. W. Y. Hornsby and T. A. Ricketts, *Ear Hear.* 28(2), 177-186 (2007); T. Ricketts et al., *Ear Hear.* 24(5), 424-439 (2003)) and are commonly implemented by utilizing a pair of spaced omnidirectional microphones to compute the pressure gradient between two points in space. The cost of directionality is increased self-noise of the configuration due to the measurement of small pressure differences. For a spaced pair, the ratio of pressure difference, |ΔP|, to acoustic pressure is k$\Delta$x where k is the wavenumber and Δx is the spacing between the pair. For a pair of microphones separated by 4 mm measuring sound at 1 kHz, the driving pressure difference is 23 dB below the acoustic pressure, and the input-referred self-noise of the configuration increases proportionally. Considering MEMS microphones have noise floors typically in the 32 dBA range, total noise in excess of 55 dBA is anticipated.

Miles et al. introduced and developed a biologically inspired "rocking" structure that is hinged by a torsional pivot and mechanically selective to the direction of incoming sound. (C. Gibbons and R. N. Miles, *Proceedings of the International Mechanical Engineering Congress and Exposition (IMECE)* (ASME, 2000), pp. 1-7; K. Yoo et al., *Sens. Actuators A* 97-98, 448-456 (2002)) In addition to offering a very compact pressure gradient microphone with experimentally verified "figure-of-8" directivity, laboratory prototypes simultaneously demonstrated a 10-dB lower noise floor and ten times reduction in size compared to state-of-the-art low-noise miniature microphones used in hearing aids. Demonstrations to date have relied on an optical readout approach. (W. Cui et al., in *MEMS* 2006 (Istanbul, Turkey, 2006), pp. 614-617; R. N. Miles et al., *J. Acoust. Soc. Am.* 125(4), 2013-2026 (2009); N. A. Hall and F. L. Degertekin, *Appl. Phys. Lett.* 80(20), 3859-3861 (2002)) Although advances in low-profile packaging of optical microphones have been recently demonstrated, (M. L. Kuntzman et al., *J. Microelectromech. Syst.* 20(4), 828-833 (2011)) consideration of other approaches may prove advantageous.

Piezoelectric MEMS microphones have been explored and advanced by many research teams. (P. R. Scheeper et al., *Sens. Actuators A* 44, 1-11 (1994)) Piezoelectric materials commonly used for micromachined microphones are zinc oxide (ZnO), (E. S. Kim and R. S. Muller, *IEEE Electron Device Lett.* 8(10), 467-468 (1987); M. Royer et al., *Sens. Actuators* 4, 357-362 (1983); S. S. Lee et al., *J. Microelectromech. Syst.* 5(4), 238-242 (1996)) aluminum nitride (AlN), (M. D. Williams et al., *J. Microelectromech. Syst.* 21(2), 270-283 (2012); R. S. Fazzio et al., in *The 14th International Conference on Solid-State Sensors, Actuators and Microsystems* (Lyon, Frace, 2007), pp. 1255-1258) and lead zirconate titanate (PZT). (S. A. Saleh et al., in 2003 *IEEE 46th Midwest Symposium on Circuits and Systems* (2003), Vol. 2, pp. 897-900; H. J. Zhao et al., in *The 12th International Conference on Solid State Sensors, Actuators and Microsystems* (Boston, 2003), pp. 234-237; H. Stephen et al., *J. Acoust. Soc. Am.* 122(6), 3428-3436 (2007)) PZT is a common material for piezoelectric acoustic sensors because it has significantly higher piezoelectric coefficients and coupling factors than AlN and ZnO, although AlN has recently garnered attention due to low dielectric loss and the potential for overall signal-to-noise ratio (SNR) improvements. (M. D. Williams et al., *J. Microelectromech. Syst.* 21(2), 270-283 (2012)) In this example embodiment, a device is disclosed that synthesizes the pioneering directional microphone work by Miles et al. with advances in piezoelectric MEMS fabrication to produce a rocking style microphone with an integrated PZT readout mechanism. The microfabrication process is presented along with directivity measurements, which confirm the anticipated functionality of the device.

Figure 18:
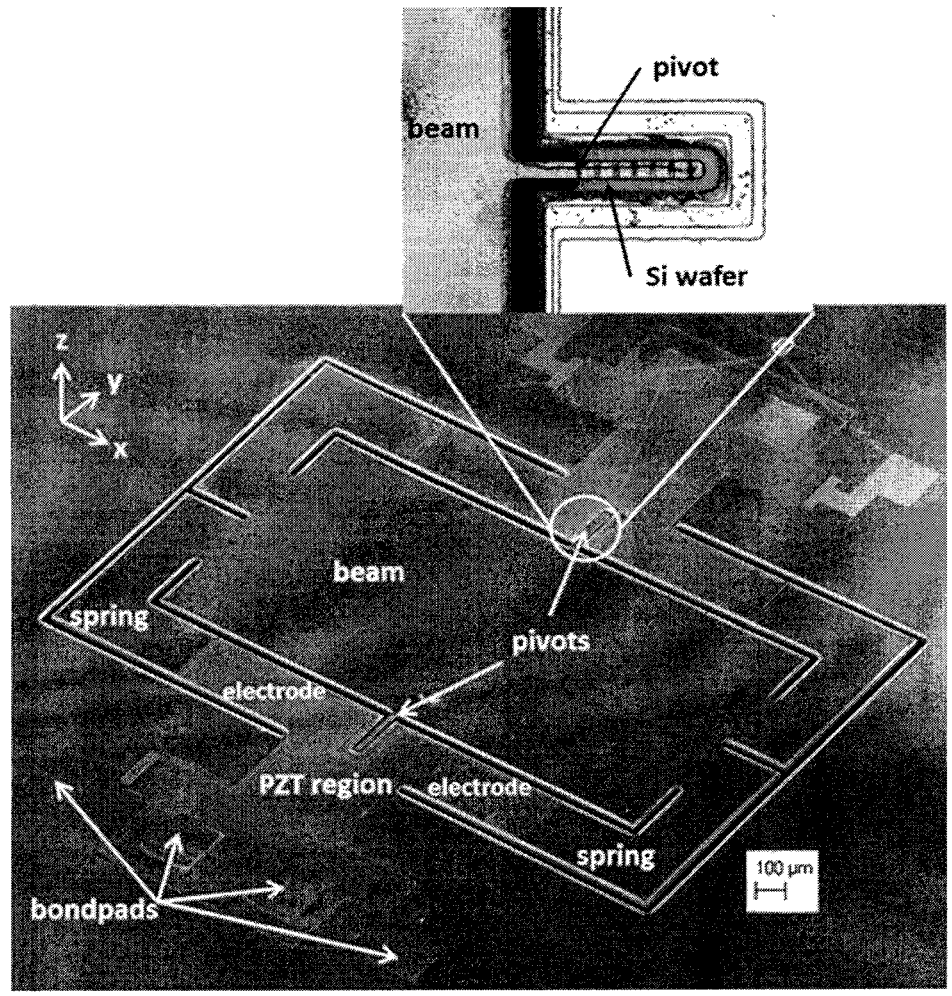
FIG. 18. is a SEM micrograph an of an acoustic sensor and a pivot structure in accordance with the description herein.

FIG. 18 presents a scanning electron micrograph (SEM) of a completed device, which consists of a 20-μm-thick beam anchored by two torsional pivots to a bulk silicon substrate. As in the case of Ref. 9 (R. N. Miles et al., *J. Acoust. Soc. Am.* 125(4), 2013-2026 (2009)), the pivots are designed to provide high rotational compliance to facilitate rotation of the beam about the y-axis and high bending stiffness to resist translational deflection of the beam in the z-direction. Four springs are attached to the ends of the rotating beam so that the springs deflect upon rotation of the beam. The springs contain a thin piezoelectric film (900 nm) operating in the 3-1 mode to convert elastic strain at the spring surface to an electric potential that can be read across platinum (Pt) electrodes, with signals routed to the edge of the die to bond pads as shown in FIG. 18. The device is designed to rotate in response to sound arriving from the x-direction due to pressure differences applied across the beam resulting from the finite speed of sound. Sound waves arriving from the y and z-directions apply a balanced pressure to both sides of the beam. A dipole or figure-8 response to sound pressure is therefore anticipated, with the x-axis as the sensitive axis of the dipole.

Figure 19:
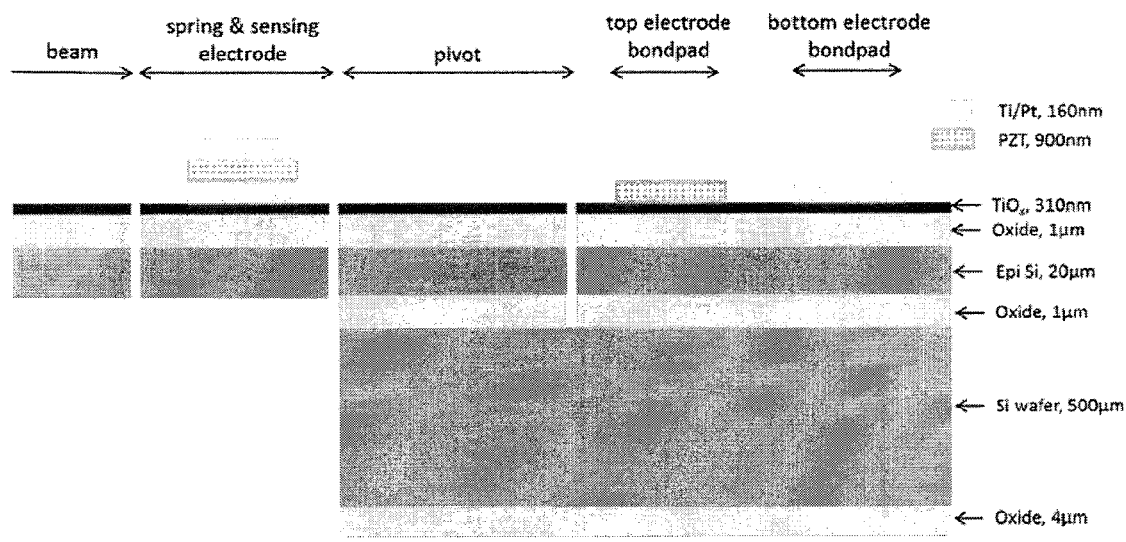
FIG. 19. is a cross-sectional schematic of acoustic sensor in accordance with the description herein.

FIG. 19 presents additional details via a device cross section. The device is fabricated on a silicon-on-insulator (SOI) wafer with 2-μm buried oxide thickness and 20-μm epitaxial silicon device layer. Low pressure chemical vapor deposition (LPCVD) silicon dioxide is deposited on the front and back of the wafer. The backside oxide is used as an etch mask for a deep reactive ion etch (DRIE) later in the process. Titanium (Ti) is deposited by e-beam evaporation and is thermally oxidized to form titanium oxide ($TiO_x$), which serves as a lead diffusion barrier. The bottom and top electrodes are deposited by DC and RF magnetron sputtering of Ti and Pt, respectively. PZT is deposited using a chemical solution process. The beam, springs, and pivot structures are patterned together in a top side etch, and the backside cavity is formed using a DRIE process. The inset of FIG. 18 shows that the device layer silicon is etched around the perimeter of the pivot, which might give the false impression of a free-floating hinge. As the cross section in FIG. 19 makes clear, the pivot is anchored through the embedded oxide layer.

Figure 20:
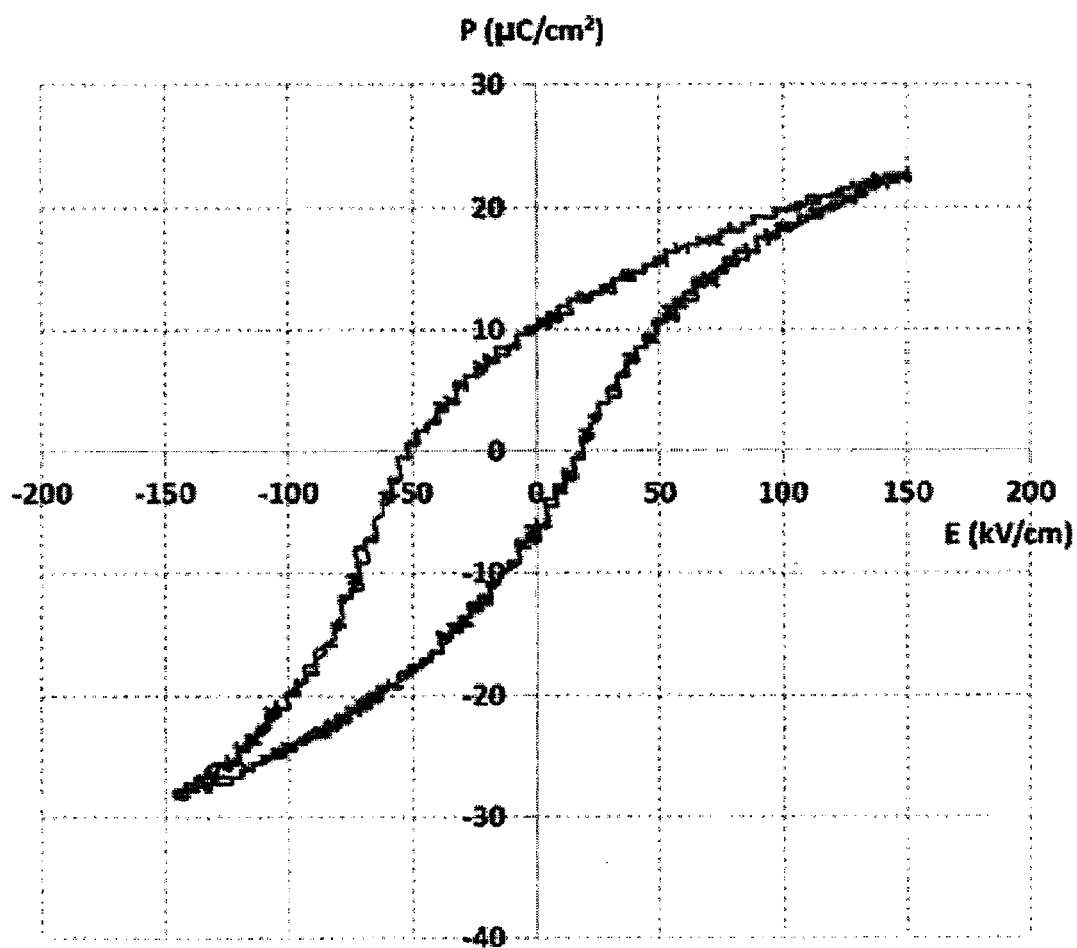
FIG. 20. is a graph representing a polarization hysteresis loop of an acoustic sensor in accordance with the description herein.
Figure 21A:
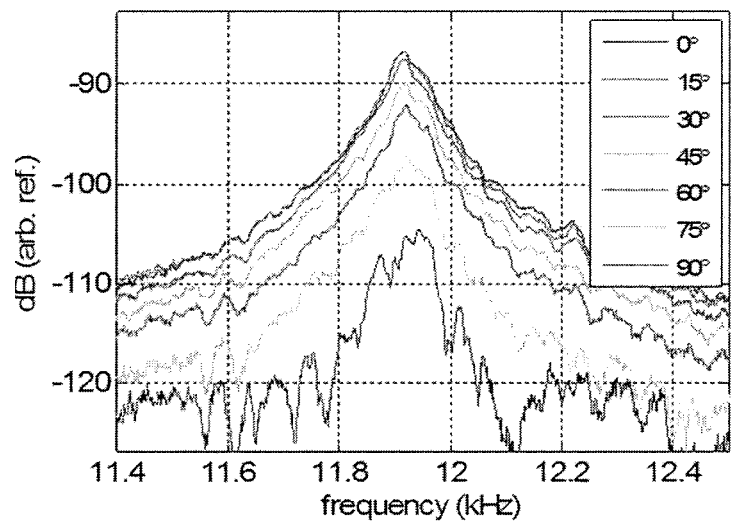
FIG. 21A. is a graph representing a response to acoustic excitation of an acoustic sensor in accordance with the description herein.
Figure 21B:
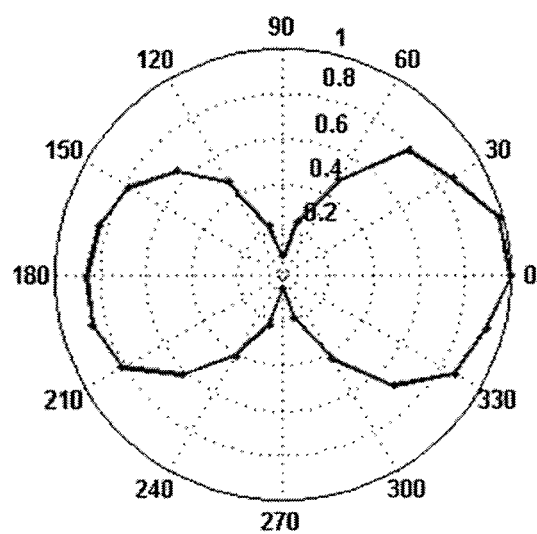
FIG. 21B. is a graph representing the measured directivity of an acoustic sensor in accordance with the description herein.

The ferroelectric properties of the PZT films were verified by measuring polarization vs. electric field using a standard Sawyer-Tower circuit. (C. B. Sawyer and C. H. Tower, *Phys. Rev.* 35(3), 269-273 (1930)) The anticipated hysteresis behavior is observed in FIG. 20, where saturation and remnant polarizations of 22 and 10 $\mu C/cm^2$, respectively, are observed. These values are similar to those presented by other researchers in the field and indicative of films with strong ferroelectric properties. (C. Wang et al., *Appl. Phys. Lett.* 90, 172903 (2007); M. Deshpande and L. Saggere, *Sens. Actuator A* 135, 690-699 (2007); H. Jacobsen et al., *Sens. Actuator A* 135, 23-27 (2007)) The directivity of the structure was verified by applying a broadband chirp signal through an Adam A5 studio monitor and measuring the device output spectrum with a Prism dScope Series III audio signal analyzer. A standard non-inverting amplifier with 10-M$\Omega$ input bias resistor and 10× gain was used to amplify the signal from the device. The frequency response in proximity of the first rotational mode of the device is presented in FIG. 21A for multiple angles of incidence. As anticipated, the amplitude of the output is highly sensitive to angle of incidence. Full 360° measurements were performed at the first mode frequency to generate the measured directivity plot in FIG. 21B, demonstrating the anticipated device function.

With some assumptions permitted, a simple analysis can be used to explore performance possibilities. A description of variables in the analysis is presented in Table I. The mechanical response of a rotational system may be expressed as $$\theta(\omega) = \frac{\frac{M_0}{I}}{\omega_0^2 + j2\omega_0\omega\zeta - \omega^2}, \quad (1)$$

where $M_0$ is the applied moment. The device is small relative to the wavelength of incoming sound, so pressure arriving along the sensitive axis can be approximated using a two-term Taylor series about the pivot location, x=0, as $$p(x, t) \approx p(0, t) + x\frac{\partial p}{\partial x}\bigg|_{x=0} = P_0(1 - jkx)e^{j\omega t}, \quad (2)$$

where the second form assumes time-harmonic plane waves, and $P_0$ is the amplitude of the incident sound pressure. Only the smaller kx term contributes to the moment, which can be computed as $M_0 = -jkP_0 I_A$. Substituting known formulae for I and $I_A$ and defining rotational sensitivity, $S_{rot}$, as the beam rotation per sound pressure leads to $$S_{rot} = \frac{-jk}{pt\omega_0^2}\left(\frac{1}{1 - r^2 + 2j\zeta r}\right), \quad (3)$$

$$r \equiv \frac{\omega}{\omega_0}.$$

For a design with a 4-$\mu$m-thick Si device layer, 1 mm×2 mm beam size, $f_n$=1 kHz, and $\zeta$=0.5, the beam tip deflection at each end can be computed as 50 nm/Pa at a frequency of 1 kHz. Modeling the end-springs as cantilevers fabricated in the device layer yields a simple approach to computing the open-circuit voltage from thin PZT films atop the spring surface. Reference 25 (D. Kim et al., *J. Microelectromech. Syst.* (published online)) provides an analytical expression for this situation and summarizes experimentally derived properties of microfabricated PZT films. For a 1-mm-long, 200-$\mu$m-wide spring with a 2-$\mu$m-thick film covering ⅔ of a spring's length, an open circuit voltage of 0.61 mV/Pa is computed. The dominant noise source in small-scale piezoelectric sensors is most commonly the result of dielectric loss in the film—typically expressed as the ratio of real to imaginary film impedance, or tan $\delta$. The loss resistance in series with the device capacitance is $R_L$=tan $\delta/\omega C_{eb}$ and its generated noise appears directly at the sensor output. Tan $\delta$ values of 0.03 are common for PZT. (L.- P. Wang et al., *J. Microelectromech. Syst.* 12(4), 433-439 (2003)) Again using film properties from Ref 25 (D. Kim et al., *J. Microelectromech. Syst.* (published online)), a noise density of 13 nV/√Hz is computed at 1 kHz which, when referred to the input sensitivity of 0.61 mV/Pa, yields an equivalent pressure noise of 22 $\mu$Pa/√Hz at 1 kHz. The combined effect of the frequency-dependent loss resistance and sensitivity governed by Eq. (3) results in an input referred pressure noise that has a minimum value at the resonant frequency, $f_n$, has a slope of -30 dB/dec below $f_n$, and a +10 dB/dec slope above $f_n$. A-weighted integration of this noise results in a 48 dBA noise floor for a single spring. Summing the output from four springs should yield a 6 dB improvement and a device noise of 42 dBA. As shown by Miles et al., (R. N. Miles et al., *J. Acoust. Soc. Am.* 125(4), 2013-2026 (2009)) the equivalent noise of two Knowles EM microphones separated by 10 mm is approximately 48 dBA. The simple analysis of the device technology under study suggests that better noise floors are achievable (6-dB improvement) from a single sensor more than 5× smaller in size. The intent of this disclosure is not to present an optimized design, but rather to demonstrate feasibility of an embodiment of the device. Use of different device dimensions, thicker films, bimorph films as opposed to single layer films, and/or different materials with lower tan $\delta$, such as AlN, may enable the possibility to yield lower noise.

TABLE I

Summary of device parameters.

| Parameter | Description |
| --- | --- |
| $\theta$ | Angular rotational displacement of beam |
| $C_{eb}$ | Blocked capacitance of PZT film |
| $\omega_0$ | National resonant frequency |
| $C_m$ | Rotational compliance |
| $\zeta$ | Damping ratio |
| t | Beam thickness |
| b | Beam width |
| L | Beam length |
| m | Beam mass |
| $I_A = \frac{bL^3}{12}$ | Second moment of area |
| $I = \frac{mL^2}{12}$ | Mass moment of inertia |

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein are possible in view of the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, apparatus, articles of manufacture, and/or systems, which can, of course, vary. It is also to be understood that the terminology used herein is for the purpose of describing particular embodiments only, and is not intended to be limiting.

With respect to the use of substantially any plural and/or singular terms herein, such terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense as would be understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense as would be understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. A range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An acoustic sensor comprising:
   a plate having a first distal end opposite a second distal end, the plate configured to rotate about an axis disposed between the first distal end and the second distal end; and
   a detector configured to detect a torque of the plate about the axis in response to received acoustic energy and to indicate a direction of a source of the acoustic energy relative to the sensor; and
   a first spring attached to the plate, wherein at least a portion of the first spring contains piezoelectric material.

2. The acoustic sensor of claim 1 wherein the first spring is attached to the first distal end configured to resist rotation of the plate.

3. The acoustic sensor of claim 2 wherein the first spring comprises a beam.

4. The acoustic sensor of claim 3 wherein the beam is oriented substantially perpendicular to the first distal end of the plate.

5. The acoustic sensor of claim 3 wherein a first portion of the beam is oriented substantially perpendicular to the first distal end of the plate and a second portion of the beam is oriented substantially parallel to the first distal end of the plate.

6. The acoustic sensor of claim 3 wherein the detector is disposed on at least a portion of the beam.

7. The acoustic sensor of claim 1 wherein the first spring is attached to the first distal end, wherein a second spring is attached to the second distal end, the first and second springs configured to resist rotation of the plate.

8. The acoustic sensor of claim 1 wherein the plate is affixed to a substrate via mounts and the mounts are freely rotatable during torque of the plate.

9. The acoustic sensor of claim 1 wherein the plate is fixed to a substrate via mounts and the mounts torsionally deform during torque of the plate.

10. An acoustic sensor comprising:
 a rotatable plate affixed to a substrate via one or more mounts;
 the plate configured to apply a torque to the one or more mounts, the torque corresponding to a direction of a source of acoustic energy relative to the sensor; and
 at least one detector configured to detect a torque of the plate about an axis.

11. The acoustic sensor of claim 10 wherein the plate further comprises a spring attached to the first distal end configured to resist rotation of the plate.

12. The acoustic sensor of claim 11 wherein the spring comprises a beam.

13. The acoustic sensor of claim 10 wherein the one or more mounts are freely rotatable during torque of the plate.

14. The acoustic sensor of claim 10 wherein the one or more mounts torsionally deform during torque of the plate.

15. A method of sensing a direction of acoustic energy comprising:
 receiving acoustic energy on a first distal end and a second distal end of a plate wherein the direction of the source of acoustic energy causes a difference in force applied to the first distal end and the second distal end;
 allowing the plate to rotate about an axis in response to the difference in force applied to the first distal end and the second distal end, wherein a spring is attached to the plate, wherein at least a portion of the spring contains piezoelectric material;
 measuring the torque causing the plate to rotate with a detector.

16. An acoustic sensor, comprising:
 a plate having a first distal end opposite a second distal end, the plate configured to rotate about an axis disposed between the first distal end and the second distal end; and
 a plurality of detectors configured to detect a torque of the plate about the axis in response to received acoustic energy and to indicate a direction of a source of the acoustic energy relative to the sensor, wherein each of said detectors are read individually, wherein said readings are added or subtracted to selectively measure modes of said sensor.

17. An acoustic sensor, comprising:
 a plate having a first distal end opposite a second distal end, the plate configured to rotate about an axis that is oriented parallel to a y-axis of said sensor;
 a substrate affixed to the plate via one or more mounts that torsionally deform during torque of the plate, wherein the one or more mounts deform when the plate is rotated, wherein the one or more mounts impart resistance to rotation of the plate; and
 one or more detectors configured to detect the torque of the plate.

18. The acoustic sensor as recited in claim 17, wherein the one or more detectors employ piezoelectric sensors to measure pressure, strain or force in the one or more mounts.

19. The acoustic sensor as recited in claim 17, wherein the one or more detectors comprise:
 electrode pairs configured to sense shear stress in the one or more mounts.

* * * * *